US007376904B2

(12) United States Patent
Cifra et al.

(10) Patent No.: US 7,376,904 B2
(45) Date of Patent: May 20, 2008

(54) AUTOMATIC GENERATION OF PROGRAMS WITH GUI CONTROLS FOR INTERACTIVELY SETTING OR VIEWING VALUES

(75) Inventors: Chris Cifra, Cedar Park, TX (US); Kevin Schultz, Georgetown, TX (US); Jeff Kellam, Cedar Park, TX (US); Jeff Correll, Cedar Park, TX (US); Nicolas Vazquez, Austin, TX (US); Christophe Caltagirone, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1139 days.

(21) Appl. No.: 09/726,779

(22) Filed: Nov. 29, 2000

(65) Prior Publication Data

US 2004/0221238 A1 Nov. 4, 2004

Related U.S. Application Data

(63) Continuation-in-part of application No. 09/595,003, filed on Jun. 13, 2000.

(51) Int. Cl.
*G06F 3/048* (2006.01)
*G06F 9/44* (2006.01)

(52) U.S. Cl. .............. 715/763; 715/771; 715/762; 715/965; 715/967; 717/105; 717/109

(58) Field of Classification Search .............. 700/83; 345/853, 704, 743, 751, 763; 707/8; 717/105, 717/109; 715/771, 763, 762, 965, 967
See application file for complete search history.

(56) References Cited

U.S. PATENT DOCUMENTS

| 4,831,580 A | | 5/1989 | Yamada |
| 5,005,119 A | | 4/1991 | Rumbaugh et al. |
| 5,481,712 A | | 1/1996 | Silver et al. |
| 5,576,946 A | * | 11/1996 | Bender et al. ................ 700/17 |

(Continued)

OTHER PUBLICATIONS

US 6,094,526, Marrion et al. (withdrawn).

(Continued)

*Primary Examiner*—Tadesse Hailu
*Assistant Examiner*—Namitha Pillai
(74) *Attorney, Agent, or Firm*—Meyertons Hood Kivlin Kowert & Goetzel, P.C.; Jeffrey C. Hood; Jason L. Burgess

(57) ABSTRACT

A system and method for automatically (i.e., programmatically) generating a computer program based on program information, such as a prototype, wherein the program includes a graphical user interface (GUI) for specifying input values to or viewing output values from the program. The prototype may comprise a series of functional operations. One or more input and/or output parameters may be associated with each functional operation. In response to a user's request for a program implementing the prototype to be automatically generated, a list of parameters associated with the operations included in the prototype may be displayed. The user may select from the displayed list the input parameters which are desired to be interactively changeable. In response, the program may be generated such that the program has a graphical user interface including a user interface control associated with each selected input parameter.

53 Claims, 23 Drawing Sheets

U.S. PATENT DOCUMENTS

| | | | |
|---|---|---|---|
| 5,742,504 A * | 4/1998 | Meyer et al. ................. | 700/83 |
| 5,911,070 A | 6/1999 | Solton et al. | |
| 5,940,296 A | 8/1999 | Meyer | |
| 5,966,532 A | 10/1999 | McDonald et al. | |
| 6,053,951 A | 4/2000 | McDonald et al. | |
| 6,226,783 B1 | 5/2001 | Limondin et al. | |
| 6,298,474 B1 * | 10/2001 | Blowers et al. ............. | 717/104 |
| 6,366,300 B1 | 4/2002 | Ohara | |

OTHER PUBLICATIONS

Advanced Imaging, Special Report: Imaging and the Macintosh/ Robust Image Databases, Apr. 1991, pp. 18-32.

Optilab Image Processing and Analysis Software for the Apple Macintosh™ II, User's Manual, dated 1990.

MacUser, John Rizzo, Image Analyst and Enhance, Jul. 1990, pp. 55-58.

SPIE—The International Society for Optical Engineering, Steven Rosenthal and Larry Stahlberg, "Integrated Approach to Machine Vision Application Development", vol. 1386, Nov. 8, 1990, pp. 158-162.

Automatix News Release, www.applefritter.com/macclones/ automatix/newsrelease, Vision for Process Feedback and Control, Jul. 3, 2000, pp. 1-3.

IPLab, Serious Image Processing for the Macintosh II, 1990.

SPIE—The International Society for Optical Engineering, Michael S. Mort and Robert J. Fontana, "Low Cost Image Analysis Workstation Which is Menu Driven and Extensible," vol. 1232, Feb. 4, 1990, pp. 380-389.

IPLab™, User's Guide, Signal Analytics Corporation, 1991.

MacGuide Magazine, vol. 2, Issue 4, Stuart Gitlow, M.D., "X-Ray Vision," Jun. 1989, pp. 89-94.

Ric Ford, Optimage Processes Scientific Images, 1994.

Signal Analytics Corp., News Release, "Signal Analytics Brings Powerful Scientific Image Processing to the Macintosh II", Feb. 1, 1990 (2 pgs.).

IPLab, "Serious Scientific Image Processing for the Macintosh II", 1992 (4 pgs.).

IPLab, "Gives You Unparalleled Value", 1992, (6 pgs.).

Signal Analytics Corp., "IPLab Brings Affordable Scientific Image Processing to the Macintosh II", estimated 1990 (2 pgs.).

Automatix Inc., "A Seminar on Machine Vision & Image Analysis", 1993, (46 pgs.).

National Instruments, Measurement and Automation Catalogue, Interactive Vision Software, 1999, pp. 518-520.

MacUser, "Ultimage and IPLab Spectrum", Jul. 1991, (5 pgs.).

"IMAQ Vision Builder Tutorial," National Instruments, Jan. 1999.

* cited by examiner

AUTOMATIC GENERATION OF PROGRAMS WITH GUI CONTROLS FOR INTERACTIVELY SETTING OR VIEWING VALUES

PRIORITY CLAIM

This application is a continuation-in-part of co-pending application Ser. No. 09/595,003 titled "System and Method for Automatically Generating a Graphical Program to Implement a Prototype" filed Jun. 13, 2000, whose inventors are Nicolas Vazquez, Jeffrey L. Kodosky, Ram Kudukoli, Kevin L. Schultz, Dinesh Nair and Christophe Caltagirone which is hereby incorporated by reference.

FIELD OF THE INVENTION

The present invention relates to the field of computer programming, and more particularly to a system and method for automatically generating a program based on program information, wherein the automatically generated program includes a graphical user interface with user interface controls for specifying or viewing input or output parameter values to or from the program. One embodiment of the invention relates to the field of computer program prototyping, and more particularly, to the automatic generation of a computer program from a prototype.

DESCRIPTION OF THE RELATED ART

As software tools have matured and grown in popularity and complexity, it has become increasingly common for users to use software applications other than traditional application development environments to create a problem solution or design or model a computational process. For example, applications such as prototyping environments and test executives provide specialized environments enabling users to work at a higher level than a programming language does. However, there is often a tradeoff between ease-of-use and the ability to create customized solutions to a problem. For example, a user may desire the ability to enhance a solution with features that are not provided by the high level application used to create the solution. Also, it may be desirable to export the solution into other environments external to the application. Thus, in many cases it would be desirable to automatically generate a computer program which implements the solution. This would allow the user to customize the solution and integrate the solution with other applications or processes.

There are many examples of tools and applications from which it would be desirable to automatically generate a computer program. Generally, these tools and applications create information, e.g., in response to user input. When this information is used in automatically generating a computer program, the information may be referred to as, "program information". The program information may comprise any type of information specifying functionality for the generated program.

One example of a tool which creates program information that can be used in automatically generating a program is referred to as a prototyping environment. A prototyping environment may be a specialized application for developing solutions to problems in a particular problem domain. The specialized application can provide an environment that is conducive to rapidly and conveniently prototyping a problem solution.

A prototyping environment may integrate various capabilities in order to aid developers of problem solutions, depending on the particular problem domain. For example, a prototyping environment may provide a library of operations that are specific to a problem domain and may enable a user to select and execute various operations from the library. The prototyping environment may include a graphical user interface that is streamlined for interactively experimenting with various parameters associated with the selected operations and seeing the effects of the adjusted parameters. A prototyping environment may also include capabilities for simulating real-world objects or processes. A prototyping environment may be used to create program information such as a recipe, solution, or script, also called a prototype, which represents an algorithm designed by the user in the prototyping environment.

Prototyping environments may be developed for many different problem domains. For example, a prototyping environment for image processing may enable a user to load or acquire an image and apply various image processing operations to the image, such as filtering operations, morphology operations, edge detection operations, etc. Such a prototyping environment may enable the user to build a script including various operations that are applied to images, e.g., for use in a machine vision, pattern matching, shape matching, or other imaging application. Other examples of prototyping environments include:

- a sound processing environment for applying various audio operations to a sound clip, e.g., in order to analyze the sound clip, eliminate background noise, etc.
- an instrumentation environment for interacting with hardware instruments, e.g., in order to initialize an instrument, acquire data from the instrument, analyze the acquired data, etc.
- a circuit design environment for developing and testing circuit designs, e.g., for programmable logic devices As described above, it may be desirable to automatically generate a computer program based on a prototype, e.g., to implement an algorithm or process specified by the prototype. In this case the program information comprises prototype information created by the prototyping environment.

Another example of a tool which may generate program information that can be used in automatically generating a program is referred to as a test executive. A test executive application allows users to organize and execute sequences of reusable test modules, e.g., to control a test involving one or more instruments. The test executive software operates as the control center for the automated test system. More specifically, the test executive software allows the user to create, configure, and/or control test sequence execution for various test applications, such as production and manufacturing test applications. Text executive software typically includes various features, such as test sequencing based on pass/fail results, logging of test results, and report generation, among others. Similarly as described above, in some cases it may be desirable to move the execution of the test sequence from under the control of the test executive software to an independent computer program. Thus, the test sequence information may be used as program information in automatically generating the program.

In other examples, program information may be created by any of various other types of tools or applications. Further examples of program information on which an automatically generated program may be based include: a state diagram; and an existing computer program (e.g., a program to be translated to a new language or environment).

In different cases, it may be desirable to automatically generate programs in various programming languages. For example, for the image and sound processing prototyping environment examples given above it may be desirable to generate programs in C/C++, Java, Basic, Fortran, or other high-level text-based programming languages, while for the circuit design prototyping environment it may be desirable to generate a program in VHDL or Verilog.

It may also be desirable to generate programs in a graphical programming language. Generating a graphical program may be especially useful for those users who are not familiar with traditional text-based programming languages, such as C/C++, Java, etc. U.S. Pat. Nos. 4,901,221; 4,914,568; 5,291,587; 5,301,301; and 5,301,336; among others, to Kodosky et al disclose one embodiment of a graphical programming environment which enables a user to easily and intuitively model a process. The method disclosed in Kodosky et al allows a user to construct a block diagram using an editor. The block diagram may include interconnected graphical icons such that the block diagram created graphically displays a procedure or method for accomplishing a certain result. In response to the user constructing the block diagram, data structures or executable code that corresponds to the displayed procedure is automatically created. This graphical programming environment may be used for creating virtual instrumentation systems, industrial automation systems, modeling processes, and simulation, as well as for any type of general programming. Graphical programming environments such as the National Instruments LabVIEW product have become very popular. In particular, graphical programming tools are being used for test and measurement, data acquisition, process control, man machine interface (MMI), supervisory control and data acquisition (SCADA) applications, simulation, and machine vision applications, among others.

In many cases, when automatically generating a program based on program information, it would be desirable to enable the program to receive input and/or provide output. For example, in the case of a prototyping environment, various functions comprised in the prototype may have associated input and/or output parameters. The prototyping environment would typically have its own graphical user interface giving users the ability to easily adjust input/output parameters for prototype functions. It would be desirable to preserve this ability for an independent program. Thus it would be desirable to automatically create a graphical user interface (GUI) for the generated program, such that during program execution, users can specify input parameter values via user interface controls in the GUI and/or may view output parameter values via user interface controls.

SUMMARY OF THE INVENTION

One embodiment of the present invention comprises a system and method for automatically (i.e., programmatically) generating a computer program based on program information, wherein the program includes a graphical user interface (GUI) for specifying input values to or viewing output values from the program. In various embodiments, the program information may comprise any type of information specifying functionality for the generated program. The program information may comprise information created by a software application. Examples of program information include: prototype information (e.g., created by a prototyping environment), test executive information (e.g., created by a test executive application), state diagram information (e.g., created by a state diagram editor), and an existing computer program (e.g., a program to be translated to another programming language or environment).

In one embodiment, the program information may comprise information specifying a prototype, and the system and method may automatically (i.e., programmatically) generate a computer program from the prototype, wherein the program includes a graphical user interface for specifying input parameter values to or viewing output parameter values from the program. By utilizing an application specialized for developing solutions to problems in a particular domain, i.e., a prototyping environment, a user may develop a solution to a problem, i.e., a prototype. The prototype may comprise a series of functional operations that form the problem solution. For example, an image processing prototyping environment may be utilized to create a series of image processing operations, e.g., to select a series or set of machine vision or image processing tools, that may be applied to an image in order to analyze the image, e.g., in order to count the number of objects of a certain shape which appear in the image.

For each functional operation of the prototype, one or more parameters may be associated with the operation. The associated parameters may include input and/or output parameters. An input parameter provides a value affecting the behavior of the operation, while an output parameter value is set by the operation. For each input parameter, the prototyping environment may enable the user to adjust the parameter value as desired, e.g., in order to experimentally see the effect of varying the parameter value. For each output parameter, the prototyping environment may be operable to display the output parameter value, once the operation has set the value. The prototyping environment may provide a graphical user interface for setting input parameter values and viewing output parameter values. As each operation is added to the prototype, input parameter values that the user has set for the operation may be associated with the operation. Parameters may have an associated data type, e.g., a simple type such as string, integer, floating point, Boolean, etc., or a complex type which is an aggregate of one or more simple types.

Once the user has developed the desired prototype, the user may request the prototyping environment to automatically (programmatically) generate a program implementing the prototype, e.g., in order to run the program independently of the prototyping environment. In various embodiments, the prototyping environment may be operable to generate programs in any of various programming languages, including text-based or graphical programming languages. The generated program may also be targeted toward a particular application development environment, e.g., to utilize proprietary features or to create files that are formatted in a manner expected by the application development environment.

In one embodiment, the prototyping environment is operable to display a list of parameters associated with the operations included in the prototype, in response to the user requesting the program to be generated. The user may select from the displayed list the input parameters which are desired to be interactively changeable. In response, the prototyping environment is operable to programmatically generate a graphical user interface for the program, wherein the graphical user interface may include a user interface control associated with each selected input parameter, or associated with groups of input parameters. Similarly, the user may select from the displayed list the output parameters which are desired to be interactively viewable, and the prototyping environment is operable to include a user interface control (in this case an indicator or display element) for viewing each selected output parameter value on the graphical user interface. The user interface control for a given input parameter is operable to receive user input, such as during program execution, and provide this input to the associated operation in the program. Similarly, the user interface control for a given output parameter is operable to receive output data from the program, such as during program execution, and display this output to the user.

It is noted that the displayed list of parameters may group one or more related parameter values into a single item. The user interface control associated with this item may include multiple portions or fields for setting each value. Thus, the term "user interface control" may refer to an aggregate of simpler user interface controls or user interface elements which together form a suitable means for receiving an input parameter value or displaying an output parameter value. As noted above, parameters may have associated data types, and these data types may be used to determine an appropriate user interface control to create for a given parameter.

Once the user has selected the desired parameters, the prototyping environment may programmatically generate the program and the graphical user interface (or may pass the prototype information to another program that performs the generation). For each input parameter that was selected, the portion of the program that receives the input parameter is generated so as to be operable to obtain the parameter value from the corresponding user interface control in the graphical user interface. Similarly, for each output parameter that was selected, the portion of the program that produces the output parameter is generated so as to be operable to set the value of the corresponding user interface control, in order to display the value in the graphical user interface. For each input parameter that is not selected by the user, the prototyping environment may hardcode a value for the parameter into the generated program. As noted above, when an operation is added to the prototype as the prototype is being created, input parameter values that the user has set for the operation may be associated with the operation. These values may be hardcoded into the program. In one embodiment, a selectable list of parameters is not displayed, and a user interface control for each parameter is automatically created, i.e., no parameter values are hardcoded into the program.

Thus, one embodiment of the present invention provides an improved system and method for automatically or programmatically generating a computer program from a prototype, wherein the program includes an improved graphical user interface. The graphical user interface of the automatically generated computer program may be used for specifying input parameter values to or viewing output parameter values from the program.

As noted above, in other embodiments, the program information upon which the programmatically generated program is based may comprise other types of information besides prototype information. Techniques similar to those described above may be used in programmatically generating a program based on the program information, such that the program includes a graphical user interface with user interface controls for specifying input values to or viewing output values from the program. For example, in a case where the program information specifies a test executive sequence, various steps in the test executive sequence may have associated parameters. Thus, when the program is generated, the user may be prompted to choose one or more of these parameters for which to generate user interface controls, similarly as described above.

In the examples given above, the user interface controls included in the program's GUI correspond in some respect to the program information used to generate the program. For example, in the prototyping environment example discussed above, the user interface controls included in the GUI correspond to parameters of functional operations specified by the prototype information. In other embodiments, an automatically generated program may include user interface controls in the program's GUI that do not strictly correspond to program information. For example, referring again to the test executive example, in addition to including user interface controls in the GUI for receiving/displaying values of parameters associated with steps of the test executive sequence, other user interface controls for other types of purposes may also be included in the generated GUI. For example, if desired, the GUI for the program may include user interface controls for turning result logging on or off, starting or stopping the test, etc. Thus, these user interface controls may be associated with additional functionality beyond what is specified by the program information itself. Thus, in various embodiments, when the user requests that the program be automatically generated, the user may be prompted for whether to include user interface controls in the GUI for any of various types of purposes (or the user interface controls may be included by default), and the automatically generated source code for the program may include code for implementing additional functionality associated with these user interface controls.

BRIEF DESCRIPTION OF THE DRAWINGS

A better understanding of the present invention can be obtained when the following detailed description of the preferred embodiment is considered in conjunction with the following drawings, in which.

Figure 1:
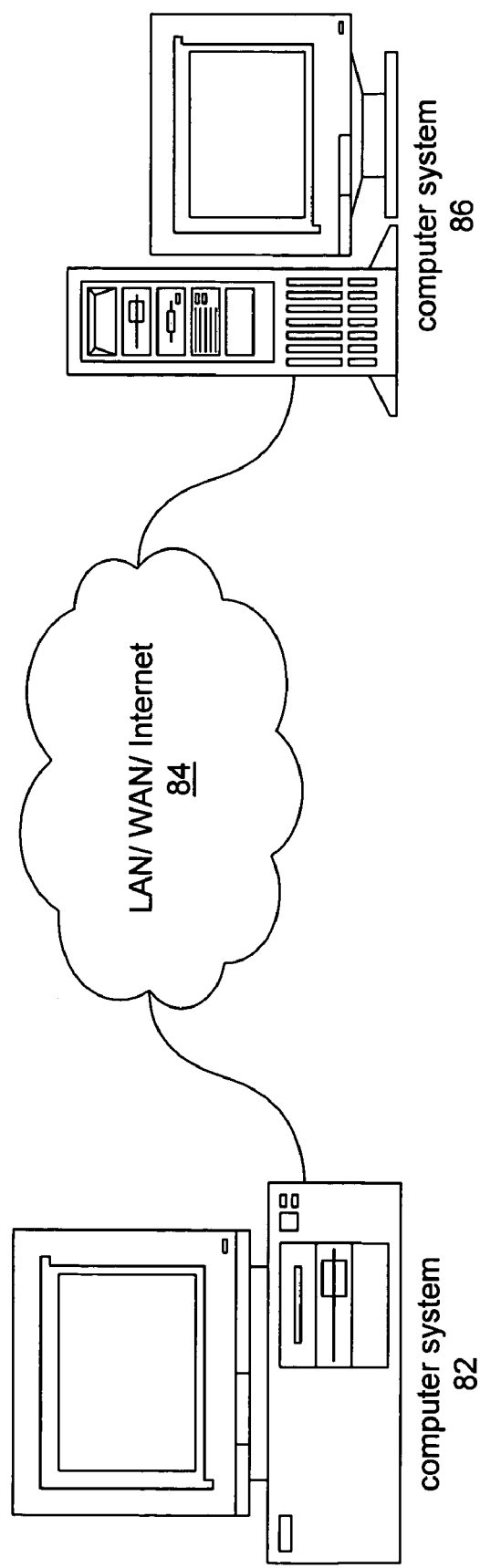
FIG. 1 illustrates a computer system connected through a network to a second computer system.

While the invention is susceptible to various modifications and alternative forms, specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternative following within the spirit and scope of the present invention as defined by the appended claims.

DETAILED DESCRIPTION OF THE PREFERRED EMBODIMENT

Incorporation by Reference

The following references are hereby incorporated by reference in their entirety as though fully and completely set forth herein.

U.S. Pat. No. 5,481,741 titled "Method and Apparatus for Providing Attribute Nodes in a Graphical Data Flow Environment," issued on Jan. 2, 1996.

U.S. patent application Ser. No. 08/810,079 titled "System and Method for Developing Automation Clients Using a Graphical Data Flow Program" filed Mar. 4, 1997.

U.S. patent application Ser. No. 09/518,492 titled "System and Method for Programmatically Creating a Graphical Program" filed Mar. 3, 2000.

U.S. patent application Ser. No. 09/595,003 titled "System and Method for Automatically Generating a Graphical Program to Implement a Prototype" filed Jun. 13, 2000.

U.S. patent application Ser. No. 09/587,682 titled "System and Method for Automatically Generating a Graphical Program to Perform an Image Processing Algorithm" filed Jun. 5, 2000.

FIG. 1—Computer System Connected to a Network

FIG. 1 illustrates an exemplary computer network in which a computer system 82 is connected through a network 84 to a second computer system 86. The computer system 82 and the second computer system 86 can be any of various types, as desired. The network 84 can also be any of various types, including a LAN (local area network), WAN (wide area network), or the Internet, among others.

In various embodiments, the computer system 82 may include or store an application or program referred to herein as a program generation (PG) program, which is operable to programmatically generate a computer program based on received program information. The program information may comprise any type of information specifying functionality for the generated program. Examples of program information include: prototype information (e.g., created by a prototyping environment), test executive information (e.g., created by a test executive application), state diagram information (e.g., created by a state diagram editor), and an existing computer program (e.g., a program to be translated to another programming language or environment).

In one embodiment, the computer system 82 may also include or store an application used to create the program information (or this application may be the same as or part of the PG program). For example, in one embodiment, the program information may comprise information specifying a prototype, and the computer system 82 may include a prototyping environment application used to create the prototype information. Alternatively, the computer system 82 may receive prototype information created by a prototyping environment application used on another computer system.

As used herein, the term "prototype" is intended to include solutions, recipes, scripts or other mechanisms which represent an algorithm or solution to a problem. For example, a prototype may comprise a series of functional operations that form a problem solution or algorithm for a particular problem. A prototype may also comprise an "object-oriented" or other type of solution representation which indicates functional operations that may be performed to accomplish a desired algorithm or solve a particular problem. As described below, a prototype may also include one or more input and/or output parameters which may be associated with operations in the prototype.

In one embodiment, a prototyping environment may be an image processing prototyping environment, but it may also be any of various other types of prototyping environments. For example, the prototyping environment may be used to develop prototypes or algorithms in any of various fields or disciplines, such as machine vision, image processing, robotics, process control, automation, test and measurement, simulation, audio, video, graphics, and workflow processes, among others. Examples of the prototyping environment include IMAQ Vision Builder from National Instruments Corporation, Checkpoint from Cognex Corporation, and IPLab Spectrum from Scanalytic Corporation, among others.

In various embodiments, the PG program which generates the program may also create the program information on which the program is based. For example, in one embodiment, the PG program may include or be associated with a prototyping environment application such as described above. In other embodiments, the PG program may interface with a separate program or application to receive the program information.

In one embodiment, the PG program may be implemented as a self-contained program or application that includes all necessary program logic for generating the program. In another embodiment, the PG program may comprise a client portion and a server portion (or client program and server program), wherein the client portion may request or direct the server portion to generate the program. For example, the client portion may utilize an application programming interface (API) provided by the server portion in order to generate the program. In other words, the client portion may perform calls to the API provided by the server portion, and the server portion may execute functions or routines bound to these calls to generate the program. In one embodiment, the server portion may be an instance of a graphical programming environment application. For example, the LabVIEW graphical programming environment application enables client programs to interface with a LabVIEW server in order to programmatically generate or modify graphical programs.

As used herein, the term "PG program" is intended to include any of various implementations of a program (or programs) that are executable to programmatically generate a program based on received program information. For example, the term "PG program" is intended to include an embodiment in which the PG program is a self-contained program or application (not implemented as a client/server program) that includes all necessary program logic for programmatically generating a program. The term "PG program" is also intended to include an embodiment in which a combination of a client portion (or client program) and server portion (or server program) operate together to programmatically generate the graphical program. The term "PG program" is also intended to include other program implementations.

In an embodiment in which a client program interfaces with a server program to generate the program, the server program may execute on the same computer system as the client program or may execute on a different computer system, e.g., a different computer system connected via a network. For example, in FIG. 1, the client program may execute on the computer system 82, and the server program may execute on the computer system 86. In this case, the program, e.g., files representing the program may be created on the computer system 82, or 86, or on a different computer system.

It is noted that the PG program may be implemented using any of various programming technologies or methodologies. Where the PG program is implemented as client and server programs, each of these programs may utilize procedure-based techniques, component-based techniques, and/or object-oriented techniques, among others. The programs may be written using any combination of text-based or graphical programming languages. Also, the programs may be written using distributed modules or components so that each program may reside on any combination of computer system 82, computer system 86, and other computer systems connected to the network 84. Also, in various embodiments, the client program may interface with the server program through a proxy software component or program.

Figure 2A:
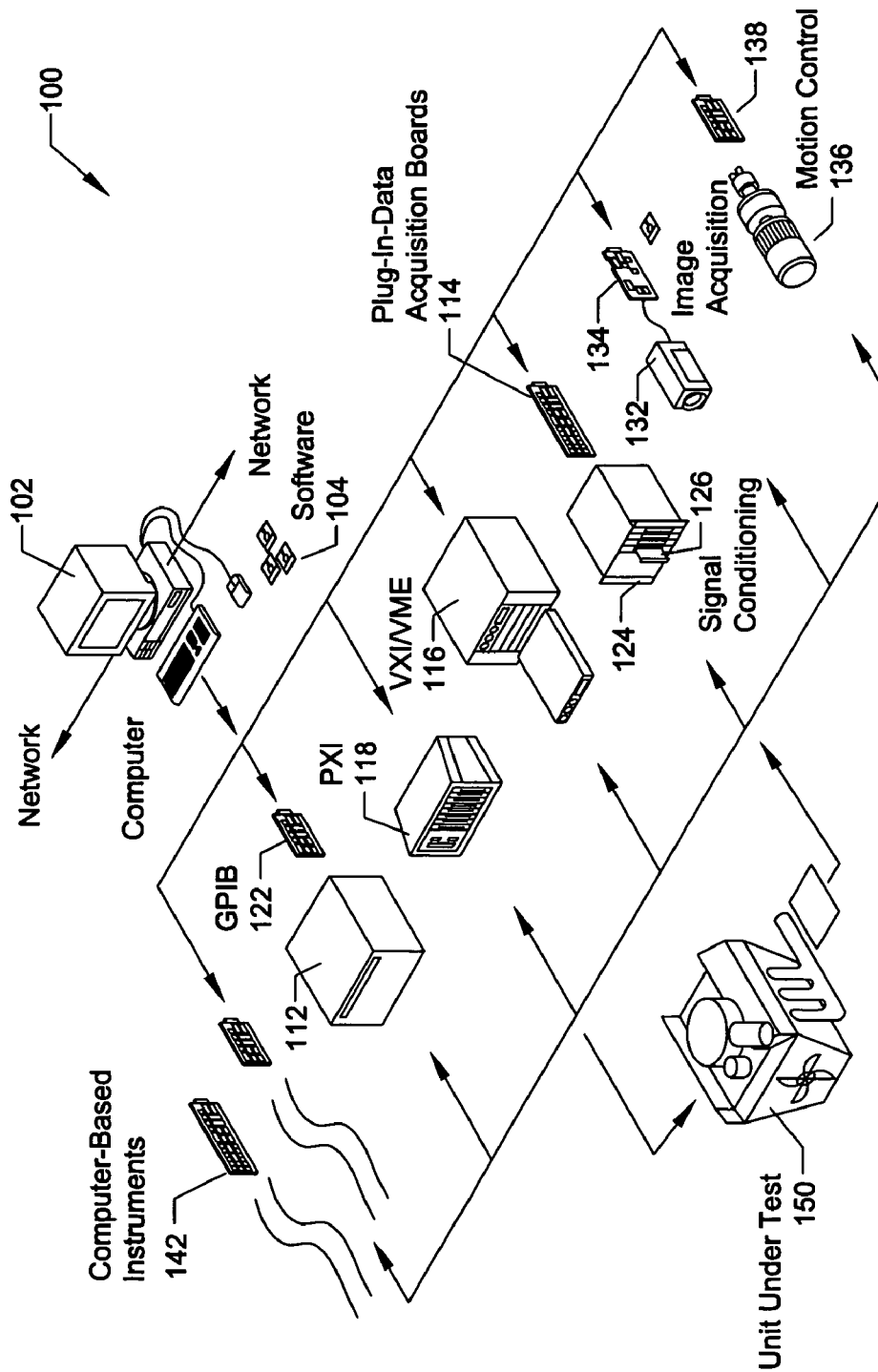
FIGS. 2A and 2B illustrate representative instrumentation and process control systems including various I/O interface options.
Figure 2B:
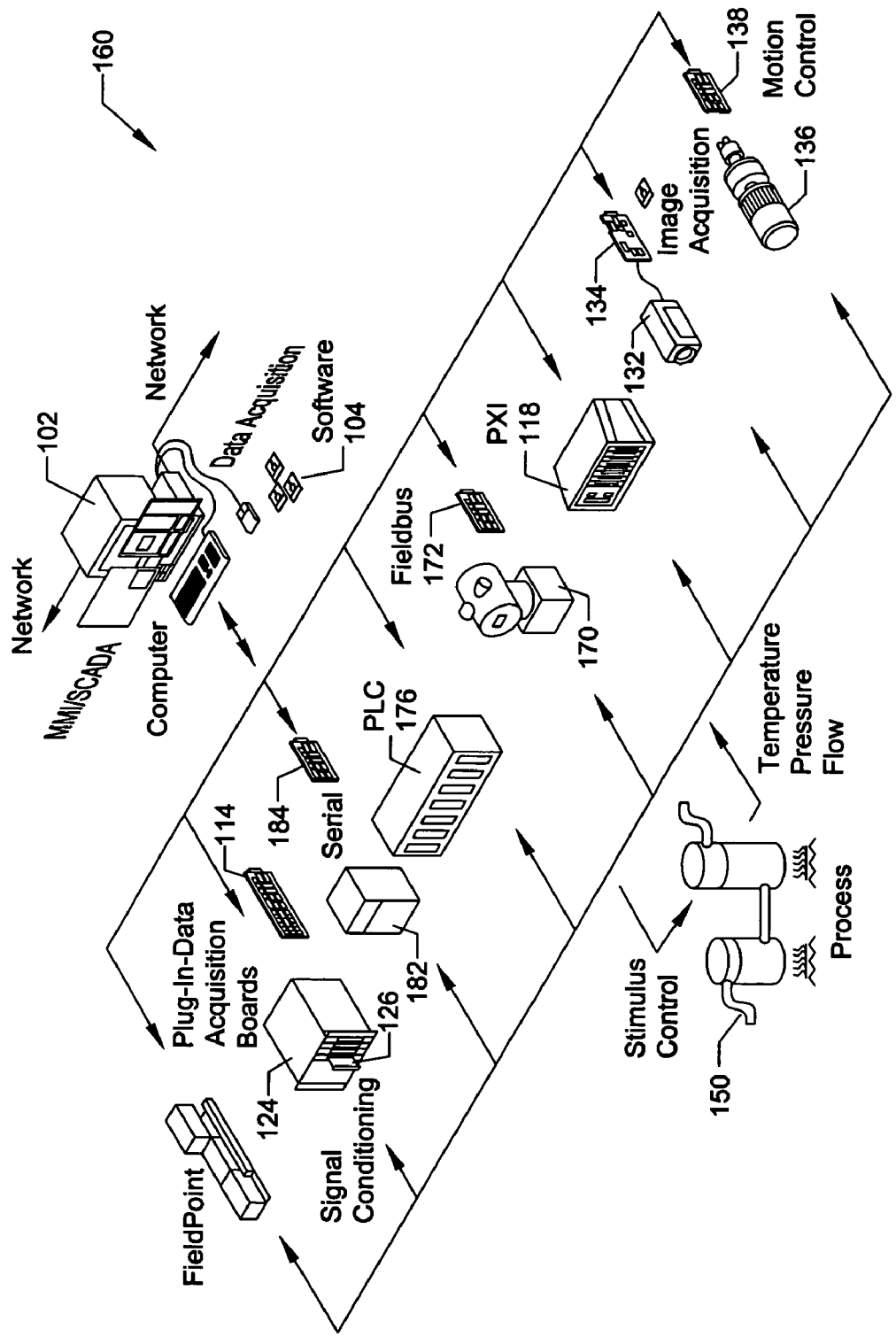

FIGS. 2A and 2B—Instrumentation and Industrial Automation Systems

FIGS. 2A and 2B illustrate exemplary systems which may store or use a PG program and/or a program to create program information used by the PG program in automatically creating programs for image processing, machine vision, instrumentation, process control, or other purposes. These programs may of course be stored in or used by other types of systems as desired.

FIG. 2A illustrates an instrumentation control system 100. The system 100 comprises a host computer 102 which connects to one or more instruments. The host computer 102 comprises a CPU, a display screen, memory, and one or more input devices such as a mouse or keyboard as shown. The computer 102 connects through the one or more instruments to analyze, measure, or control a unit under test (UUT) or process 150. The host computer 102 may store a PG program and/or a program to create program information used by the PG program in automatically creating programs, such as programs which interact with or controls the one or more instruments. In other words, the computer 102 may be either of computers 82 or 86.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via the GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control. In FIG. 2B, the host computer 102 may store a PG program and/or a program to create program information used by the PG program in automatically creating programs, such as programs that are involved with the automation function performed by the automation system 160. In other words, the computer 102 may be either of computers 82 or 86.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 2A and 2B, the computer system 102 preferably includes a memory medium on which one or more computer programs or software components according to the present invention are stored. The term "memory medium" is intended to include an installation medium, e.g., a CD-ROM, floppy disks 104, or tape device, a computer system memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having at least one processor which executes instructions from a memory medium.

In one embodiment, the PG program and/or the resulting program that is automatically created are designed for data acquisition/generation, analysis and/or display, machine vision, or for controlling or modeling instrumentation or industrial automation hardware. For example, in one embodiment, the program that is generated is a National Instruments LabVIEW graphical program or a National Instruments LabWindows/CVI C program. The LabVIEW and LabWindows/CVI programming environments provide specialized support for developers of instrumentation and industrial automation applications.

However, it is noted that the present invention can be used for a plethora of applications and is not limited to machine vision, instrumentation, or industrial automation applications. In other words, FIGS. 2A and 2B are exemplary only, and programs for any of various types of purposes may be automatically generated from PG programs targeted toward any of various types of purposes, where the PG program and the generated program are stored in and execute on any of various types of systems.

Figure 3:
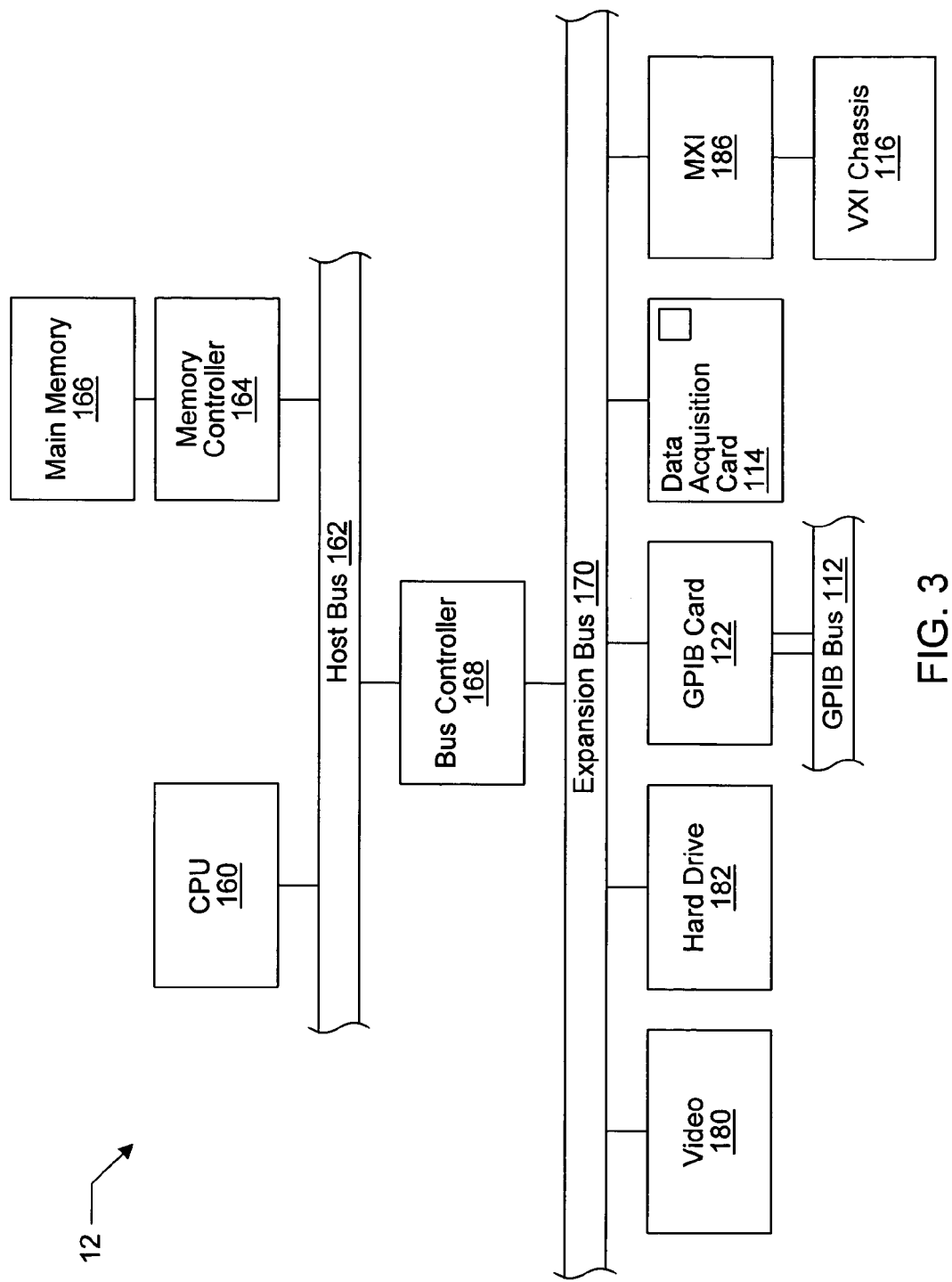
FIG. 3 is a block diagram of the computer system of FIGS. 1, 2A and 2B.

FIG. 3—Computer System Block Diagram

FIG. 3 is a block diagram of the computer system 82 or 86 (or 102) illustrated in FIGS. 1, 2A and 2B. It is noted that any type of computer system configuration or architecture can be used as desired, and FIG. 3 illustrates a representative PC embodiment. It is also noted that the computer system may be a general purpose computer system as shown in FIGS. 2A and 2B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory or random access memory 166 is coupled to the host bus 162 by means of memory controller 164.

The main memory 166 stores computer programs according to the present invention. The main memory 166 also stores operating system software as well as the software for operation of the computer system, as well known to those skilled in the art. The computer programs of the present invention will be discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 2A), a GPIB interface card 122 which provides a GPIB bus interface to the GPIB instrument 112 (of FIG. 2A), and a VXI or MXI bus card 186 coupled to the VXI chassis 116 for receiving VXI instruments. The computer 102 further comprises a video display subsystem 180 and hard drive 182 coupled to the expansion bus 170.

Figure 4:
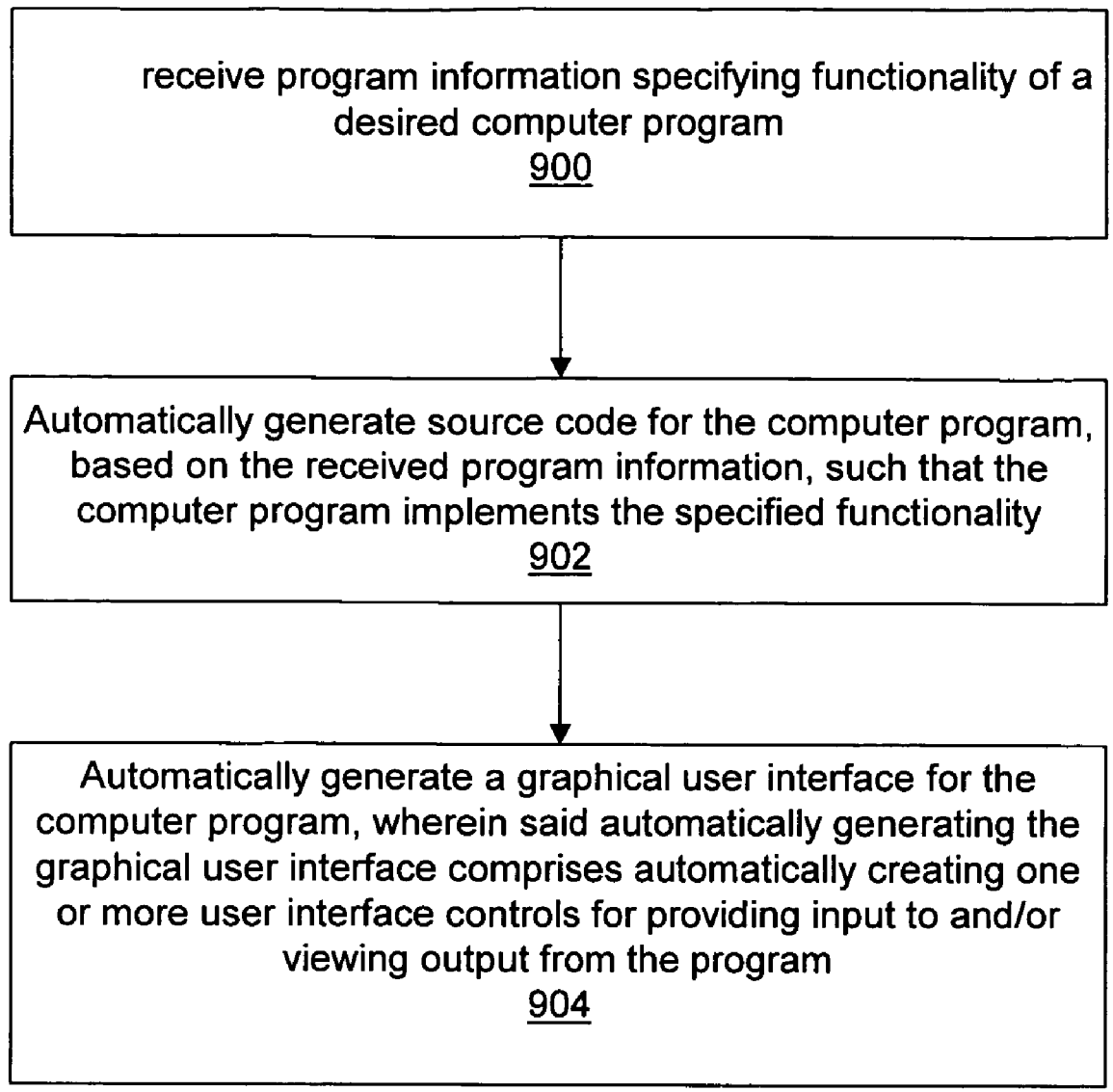
FIG. 4 is a flowchart diagram illustrating one embodiment of a method for automatically (i.e., programmatically) generating a program based on program information.

FIG. 4—Automatic Generation of a Program Based on Program Information

FIG. 4 is a flowchart diagram illustrating one embodiment of a method for automatically (i.e., programmatically) generating a program based on program information.

In step 900, program information may be received, wherein the program information specifies functionality of a desired computer program. As described above, the program information may comprise any of various types of information, such as prototype information, test executive sequence information, state diagram information, etc.

In step 902, source code for the computer program may be automatically (i.e., programmatically) generated, based on the received program information, such that the computer program implements the specified functionality. In various embodiments, the generated computer program may include any type of source code, including graphical source code and/or text-based source code.

In step 904, a graphical user interface for the computer program may be automatically (i.e., programmatically) generated, wherein said automatically generating the graphical user interface comprises automatically creating one or more user interface controls for providing input to and/or viewing output from the program.

FIGS. 5-22 illustrate an embodiment in which the program information comprises prototype information. The prototype may specify a plurality of functional operations, wherein each functional operation may have associated input and/or output parameters. As described below, the method may operate to automatically generate a program based on the prototype information, wherein the program includes a graphical user interface with input/output user interface controls corresponding to parameters of the prototype's functional operations.

In other embodiments, the program information upon which the programmatically generated program is based may comprise other types of information besides prototype information. Techniques similar to those described below may be used in programmatically generating a program based on the program information, such that the program includes a graphical user interface with user interface controls for specifying input values to or viewing output values from the program. For example, in a case where the program information specifies a test executive sequence, various steps in the test executive sequence may have associated parameters. Thus, when the program is generated, the user may be prompted to choose one or more of these parameters for which to generate user interface controls, similarly as described above.

In the examples given above, the user interface controls included in the program's GUI correspond in some respect to the program information used to generate the program. For example, in the prototyping environment example discussed above, the user interface controls included in the GUI correspond to parameters of functional operations specified by the prototype information. In other embodiments, an automatically generated program may include user interface controls in the program's GUI that do not strictly correspond to program information. For example, referring again to the test executive example, in addition to including user interface controls in the GUI for receiving/displaying values of parameters associated with steps of the test executive sequence, other user interface controls for other types of purposes may also be included in the generated GUI. For example, if desired, the GUI for the program may include user interface controls for turning result logging on or off, starting or stopping the test, etc. Thus, these user interface controls may be associated with additional functionality beyond what is specified by the program information itself. Thus, in various embodiments, when the program is automatically generated, the user may be prompted for whether to include user interface controls in the GUI for any of various types of purposes (or the user interface controls may be included by default), and the automatically generated source code for the program may include code for implementing additional functionality associated with these user interface controls.

Figure 5:
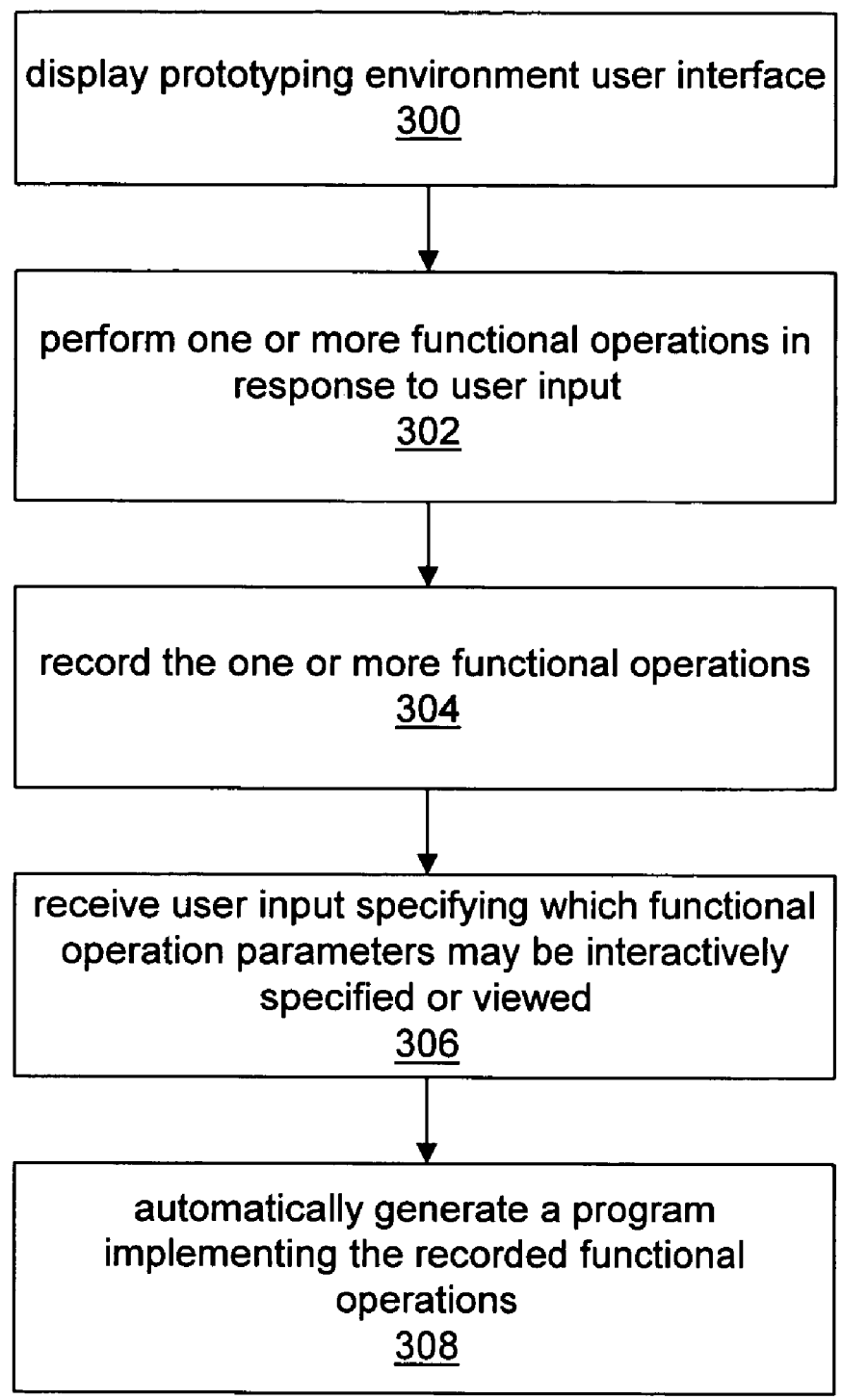
FIG. 5 is a flowchart diagram illustrating one embodiment of a method for automatically generating a program that implements a prototype created in a prototyping environment.

FIG. 5—Automatic Creation of a Program from a Prototyping Environment

FIG. 5 is a flowchart diagram illustrating one embodiment of a method for automatically generating a program that implements a prototype created in a prototyping environment. In step 300, a prototyping environment user interface for creating a prototype is displayed. As discussed above, the prototyping environment may be targeted toward creating prototype solutions to problems in any of various domains. An exemplary user interface for an image processing prototyping environment new is described below.

In step 302, one or more functional operations are performed in response to user input accepted via the user interface displayed in step 300. For example, for an image processing prototyping environment, the user may load or acquire an image via the user interface, and step 302 may comprise selecting various image processing operations and applying the operations to the image. As the image processing operations are performed on the image, the user interface may update the image or display a separate resulting image.

As shown in step 304, the functional operations performed in step 302 may be recorded, e.g., as a script which specifies steps of an algorithm or process. The functional operations may be recorded automatically in response to the user's actions of performing each functional operation, or the user may provide input explicitly requesting each desired operation to be recorded. For example, the user may first apply a given functional operation and experimentally vary parameter values associated with the operation in order to see the effects before recording the operation. The user interface may enable the user to easily modify or analyze the recorded operations by adding or removing operations, performing undo operations, moving to a particular place in the list of operations and updating the state of the environment accordingly, etc.

In step 306, input specifying which functional operation parameters may be interactively specified or viewed may be received. Each particular functional operation may have associated input parameters or settings. When developing the prototype, the user may set the input parameter values for each operation as desired, and the desired parameter values may be associated with the operation when the operation is recorded. In response to the user requesting the prototyping environment to generate the program, the prototyping environment may display a list of items corresponding to the input parameters. The user may then select the input parameters which are desired to be interactively settable. The prototyping environment is operable to create a graphical user interface (GUI) for the generated program, wherein the GUI includes a user interface control associated with each selected input parameter. The generated program is operable to accept program input from the user interface controls during program operation, wherein the program input specifies new values for the corresponding input parameters. For input parameters that are not selected by the user, the parameter values that are associated with the operation when the operation is recorded, or default values, may be hardcoded into the program. Thus, these values are not interactively settable and cannot be changed without modifying the program code.

Similarly, each particular functional operation may have associated output parameters or settings. The prototyping environment may display a list of output parameters, and the user may select for which output parameters he desires the program to display a value on the graphical user interface. In one embodiment, the prototyping environment is operable to include a user interface control corresponding to each selected output parameter on the GUI, and the generated program is operable to provide program output displaying the chosen output parameters.

The input and output parameters may be displayed in any of various ways, and may be displayed separately or together. It is noted that the displayed list of parameters may group one or more related parameter values into a single item. For example, for an image processing prototyping environment which includes an image thresholding operation, the thresholding operation may utilize input parameter values indicating the minimum and maximum pixel values to use. For these two values, the displayed list may include a single selectable item called "range" which refers to both the minimum and maximum value. The user interface control associated with this item may then include two separate portions or fields for setting each value. Thus, the term "user interface control" may refer to an aggregate of simpler user interface controls or widgets which together form a suitable means for receiving an input parameter value or displaying an output parameter value.

In step 308, a program implementing the recorded functional operations may be automatically generated, e.g., in response to a user request via the user interface. In the preferred embodiment, the step of automatically generating the computer program is performed by programmatically generating the computer program. Step 308 may be performed by the prototyping environment or by a different "program generation" program that may communicate with the prototyping environment.

In various embodiments, different types of programs, including text-based and graphical programs, may be created. Examples of a text-based program include programs written in a text language such as C, C++, Fortran, Basic, Pascal, Java, and Cobol, among others. A graphical program may be "written" or developed in a graphical language comprising icons which represent functions, operations, or objects. The user may create the graphical program by selecting the icons and connecting them together in a desired way. The icons may be connected in various manners, such as in a data flow, execution flow, and/or control flow format. In some embodiments, a graphical program has an underlying textual program representation, and in other embodiments, a graphical program does not have an underlying textual program representation. Examples of graphical programming development environments include LabVIEW, BridgeVIEW, DasyLab, and DiaDem from National Instruments, VEE from Agilent, Sanscript from Northwoods Software, WiT from Coreco, and Vision Program Manager from PPT Vision, among others.

As described below, the program associated with the displayed user interface may interact with another program, e.g., a programming development environment application, in order to create the program implementing the image processing algorithm. Also, as described above, step 308 may comprise creating a graphical user interface with user interface controls for interactively setting input parameter values or viewing output parameter values associated with the recorded operations. As noted above, parameters may have associated data types, and these data types may be used to determine an appropriate user interface control to create for a given parameter.

Step 308 may be performed in any of various ways as appropriate for a particular programming language or program development environment. For example, each recorded functional operation may correspond to a particular function or group of functions, and the prototyping environment may create a program that calls the appropriate functions. The prototyping environment may consult a database in order to determine information regarding each functional operation. One embodiment of step 308 is discussed in detail below.

As noted above, FIG. 5 represents one embodiment of a method for automatically generating an image processing program, and various steps may be combined, omitted, added, reordered, or modified as desired.

EXAMPLE

Image Processing Prototyping Environment

One particular example of a prototyping environment is discussed below, in order to gain a better understanding of one embodiment of the invention. It is noted, however, that the techniques described herein may be applied to various other domains, as desired.

FIGS. 6-13: Prototyping Environment User Interface

Figure 6:
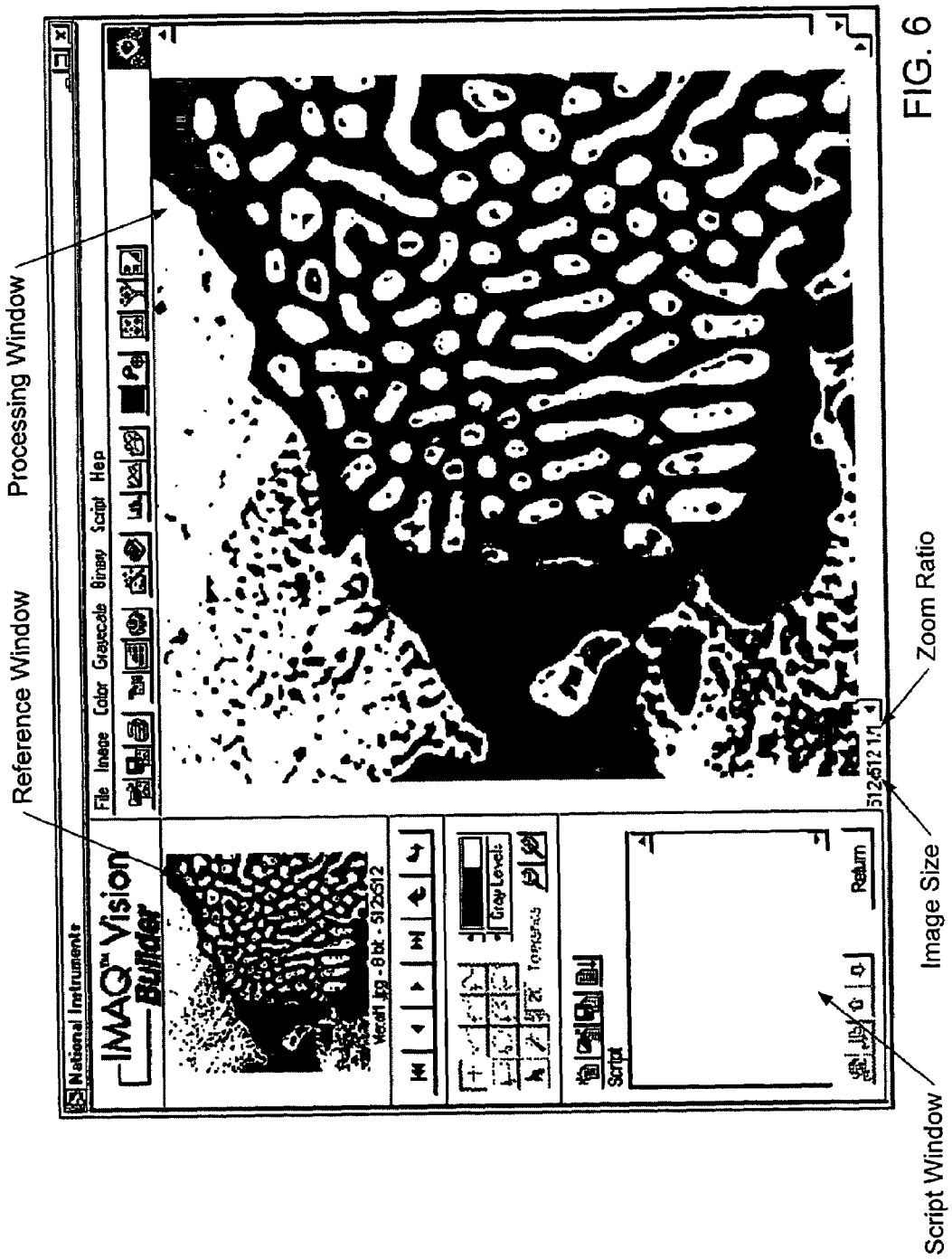
FIG. 6 illustrates an exemplary user interface for an image prototyping environment.

FIG. 6 illustrates an exemplary user interface for an image prototyping environment application according to one embodiment of the invention. The prototyping environment may enable a user to easily load an image and quickly apply various image processing operations to the image, immediately seeing the results. The image processing operations selected and applied by the user are preferably recorded as a script. Once the desired image processing algorithm has been developed, the prototyping environment may then automatically (e.g., programmatically) create a standalone computer program (or programs) in response to the script, i.e., to implement the algorithm comprised in the script.

In various embodiments, the image prototyping environment may be operable to load and manipulate any of various types of images, including gray-level and color images. The prototyping environment may also support complex images in which pixel values have a real part and an imaginary part. The images may be obtained from any of various sources. The images may, for example, be obtained from an image file, such as a BMP, TIFF, AIPD, JPG, or GIF file, or a file formatted according to another image format. The images may also be obtained from a hardware device, such as a camera. For example, images may be obtained from a device such as the video device 132 illustrated in FIGS. 2A and 2B, or from any of various other types of devices, including digital cameras, framegrabbers, etc.

The prototyping environment may support any of various image processing functions or operations. As used herein, the term "image processing" may include functions for processing an image, such as:

filtering functions for smoothing, edge detection, convolution, etc.

morphology functions for modifying the shape of objects in an image, including erosion, dilation, opening, closing, etc.

thresholding functions for selecting ranges of pixel values in grayscale and color images particle filtering functions to filter objects based on shape measurements The term "image processing" may also include functions for performing various types of image analysis, including:

a histogram function that counts the total number of pixels in each grayscale value and graphs it a line profile function that returns the grayscale values of the pixels along a line drawn through the image with a line tool and graphs the values particle analysis functions that computes such measurements on objects in an mage as their areas and perimeters a 3D view function that displays an image using an isometric view in which each pixel from the image source is represented as a column of pixels in the 3D view, where the pixel value corresponds to the altitude.

The term "image processing" may also include functions useful in machine vision applications, including:

an edge detection function that finds edges along a line drawn through the image with a line tool a pattern matching function that locates regions of a grayscale image that match a predetermined template a shape matching function that searches for the presence of a shape in a binary image and specifies the location of each matching shape a caliper function that computes measurements such as distances, areas, and angles based on results returned from other image processing functions a color matching function that quantifies which colors and how much of each color exist in a region of an image and uses this information to check if another image contains the same colors in the same ratio It is noted that the image processing functions listed above are exemplary only and that, in various embodiments of the image prototyping environment, other types of image processing functions or operations may be supported.

The user interface of the prototyping environment may enable the user to load or select an image and easily select image processing functions to apply to the image. One element illustrated in FIG. 6 is labeled as a "reference window". FIG. 6 also illustrates a "processing window". As the user applies various image processing functions to the loaded image, the processing window may display the resulting image, while the reference window displays the original unmodified image. The user may select an image processing function to apply by choosing the desired function from a menu bar or by clicking on an icon, etc.

The FIG. 6 user interface also illustrates a "script window". Each image processing function that the user applies to the image may be displayed in this script window. The image processing operations that a user applies to an image may result in a script of image processing operations specifying an algorithm that can be applied to analyze or manipulate other images. As an example, FIGS. 7-13 illustrate a process of developing an image processing script useful for "blob analysis".

A "blob" (Binary Large OBject) is a connected region or grouping of pixels in an image in which all pixels have the same intensity level. In a binary image, the background is zero, and every non-zero pixel is part of a binary object. Finding the size, number, or location of blob regions in an image may be useful for many applications, such as detecting flaws on silicon wafers, detecting soldering defects on electronic boards, locating objects in motion control applications, etc.

Figure 7:
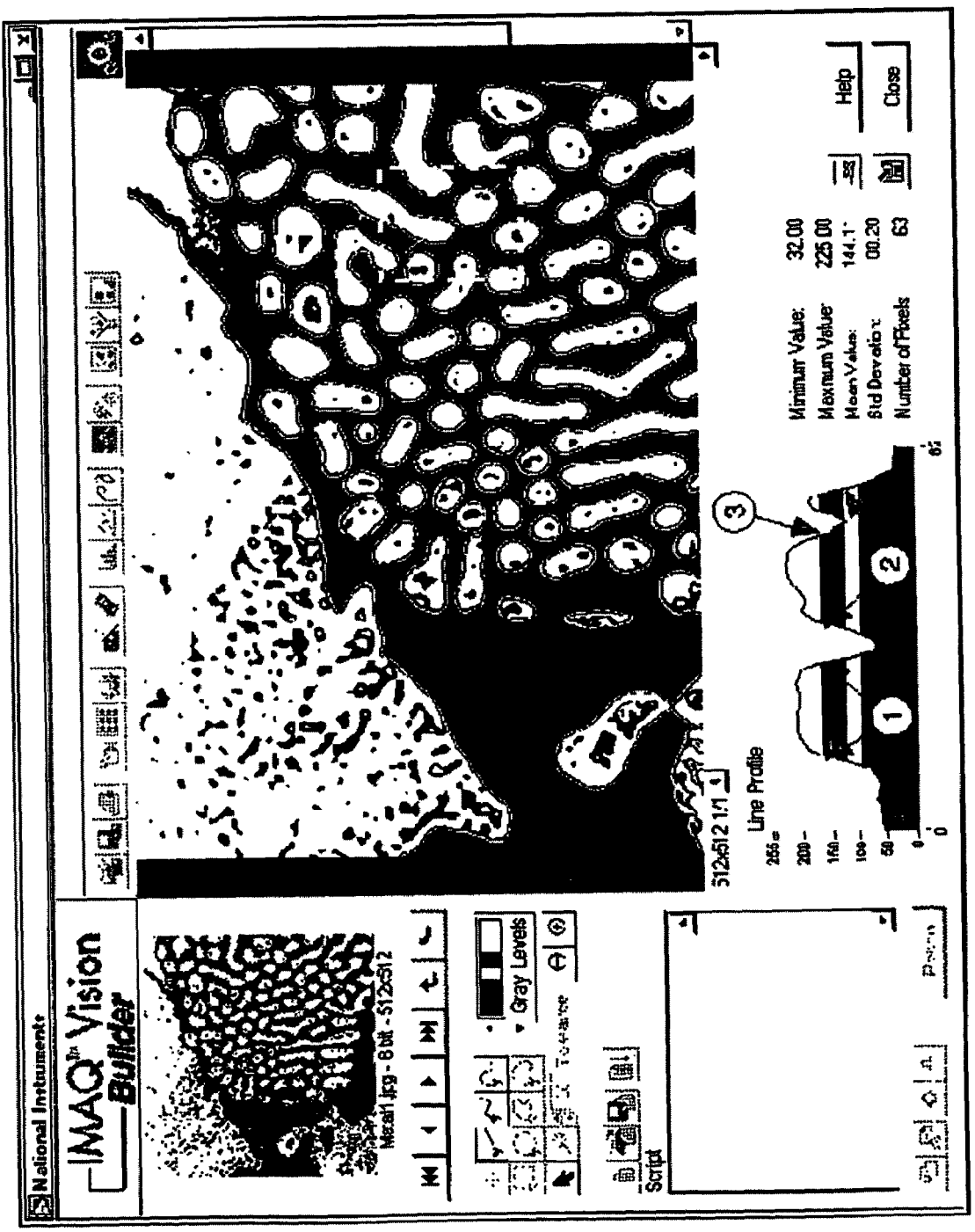
FIGS. 7-13 are screen shots illustrating a process of developing an image processing script useful for "blob analysis"

FIG. 7 illustrates an image for which the user desires to perform blob analysis. In FIG. 7, the user has selected a line profile tool and has drawn a straight line through a portion of the image in the processing window. A rectangle in the processing window indicates the location of this line. In response, the prototyping environment displays grayscale values of the line drawn with the line profile tool, such as the minimum and maximum pixel values, in the bottom of the window. Note that details regarding the image processing functions applied in FIGS. 7-13 are omitted. For background information on image processing in general or the particular image processing functions referred to herein, please refer to available literature, such as the *IMAQ Vision User Manual*, available from National Instruments Corporation.

Figure 8:
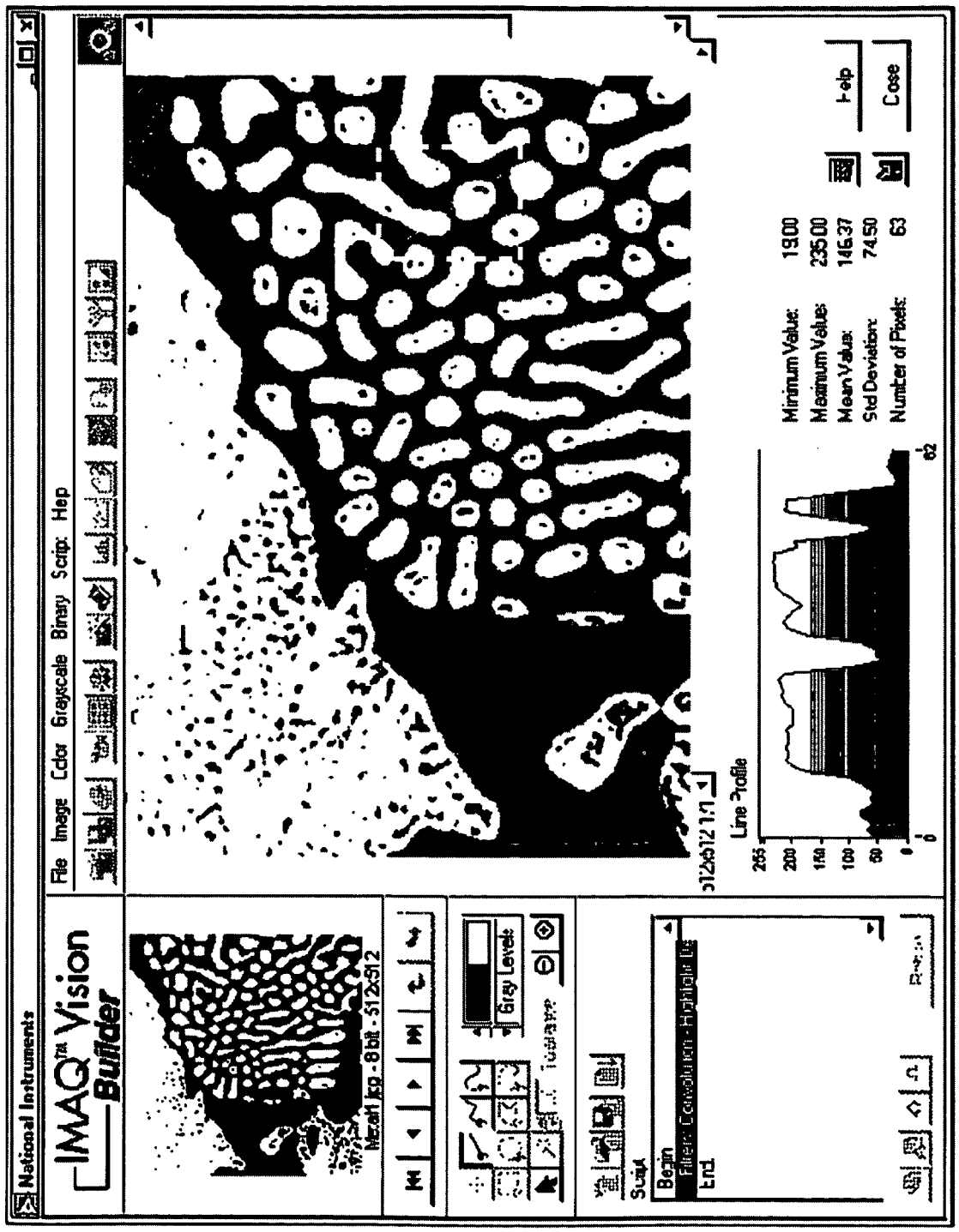

Based on the line profile grayscale values shown in FIG. 7, the user may then apply a filter to the image, e.g. to sharpen edges in the image and to create contrast between the particles and the background. The prototyping environment may provide various types of filters that may be applied, e.g., by selecting the desired filter from a menu bar. FIG. 8 illustrates the resulting image after the user has applied a "Convolution—Highlight Details" filter to the original image. Due to this filter operation, the FIG. 8 image appears to be sharper than the original image. Note that the filtering operation the user applied is recorded in the script window of FIG. 8. Note also that the grayscale values of a line drawn with the line profile tool have changed from the values shown in FIG. 7.

The next step the user may want to perform in the blob analysis is a thresholding operation to separate the particles from the background. A thresholding operation converts the grayscale image to a binary image, keeping the pixels of interest and removing the remaining pixels. The FIG. 7 processing window illustrates the results of applying a thresholding operation in which pixels with a value of 130 to 255 are kept and other pixels are removed. The thresholding operation applied to the image is recorded in the script window of FIG. 7.

It is noted that for each type of image processing function supported, the prototyping environment may be operable to display intermediate windows or screens that the user interacts with. These intermediate windows or screens may enable the user to specify various parameters or settings that apply to a particular image processing function. When the image processing function is added to the script, the specified parameters may be associated with the image processing function. The parameters may then be used when generating the desired program to implement the image processing algorithm, as described below. It is noted that various image processing functions may have output parameters as well as input parameters.

The process of developing an image processing algorithm may typically involve experimenting with various image processing functions and settings for the functions. However, FIGS. 7-13 omit such intermediate states and simply illustrate the result of applying each step in the algorithm to the image. For example, when performing a threshold operation, an intermediate screen such as shown in FIG. 10 may appear. FIG. 10 illustrates a selection box enabling the user to select the particular type of threshold operation to apply and illustrates an interactive graph with minimum and maximum threshold values that the user may adjust in order to find the desired threshold pixel values to use. When the threshold operation step is added to the script, the specified minimum and maximum values may be associated with the step.

Figure 9:
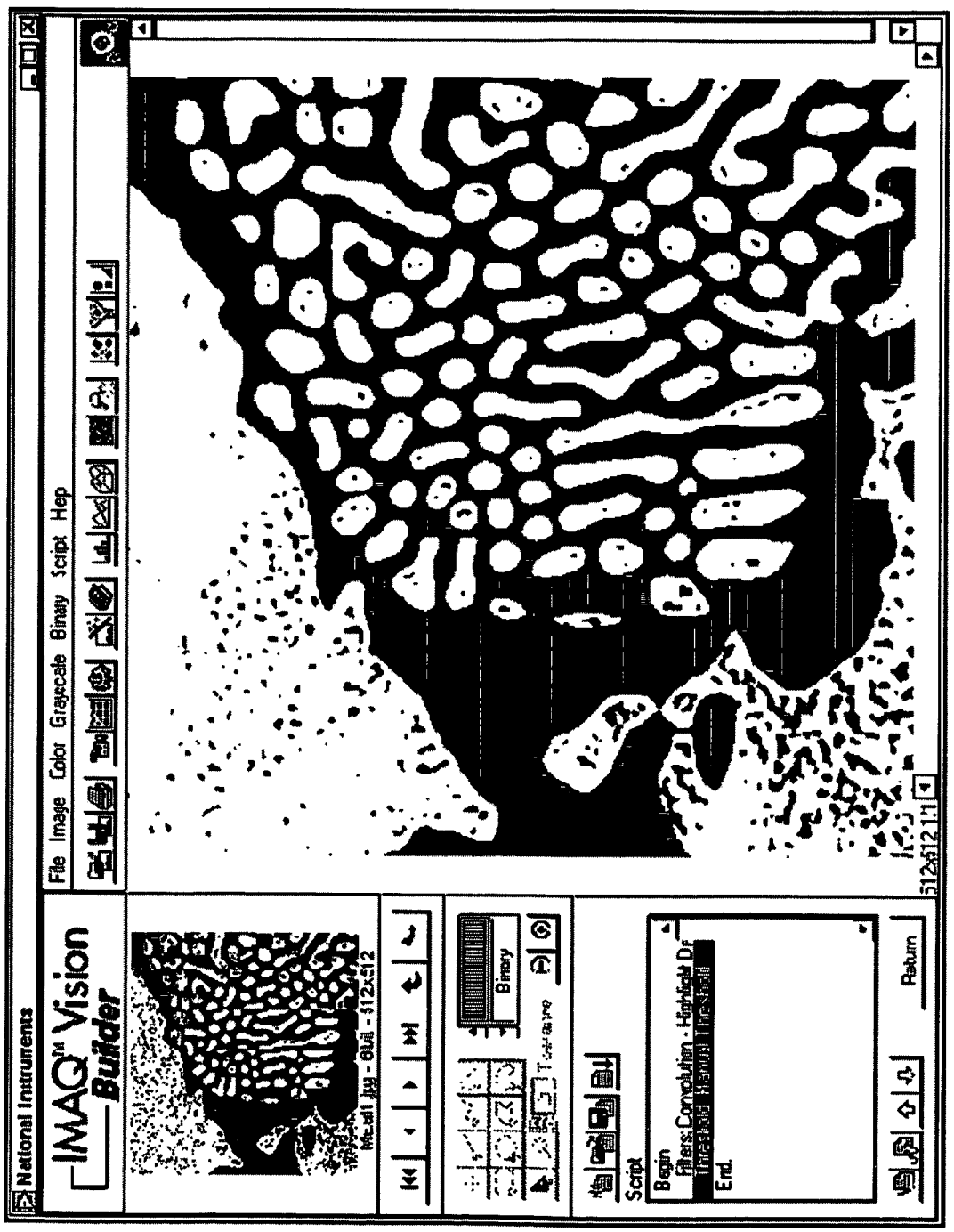
Figure 10:
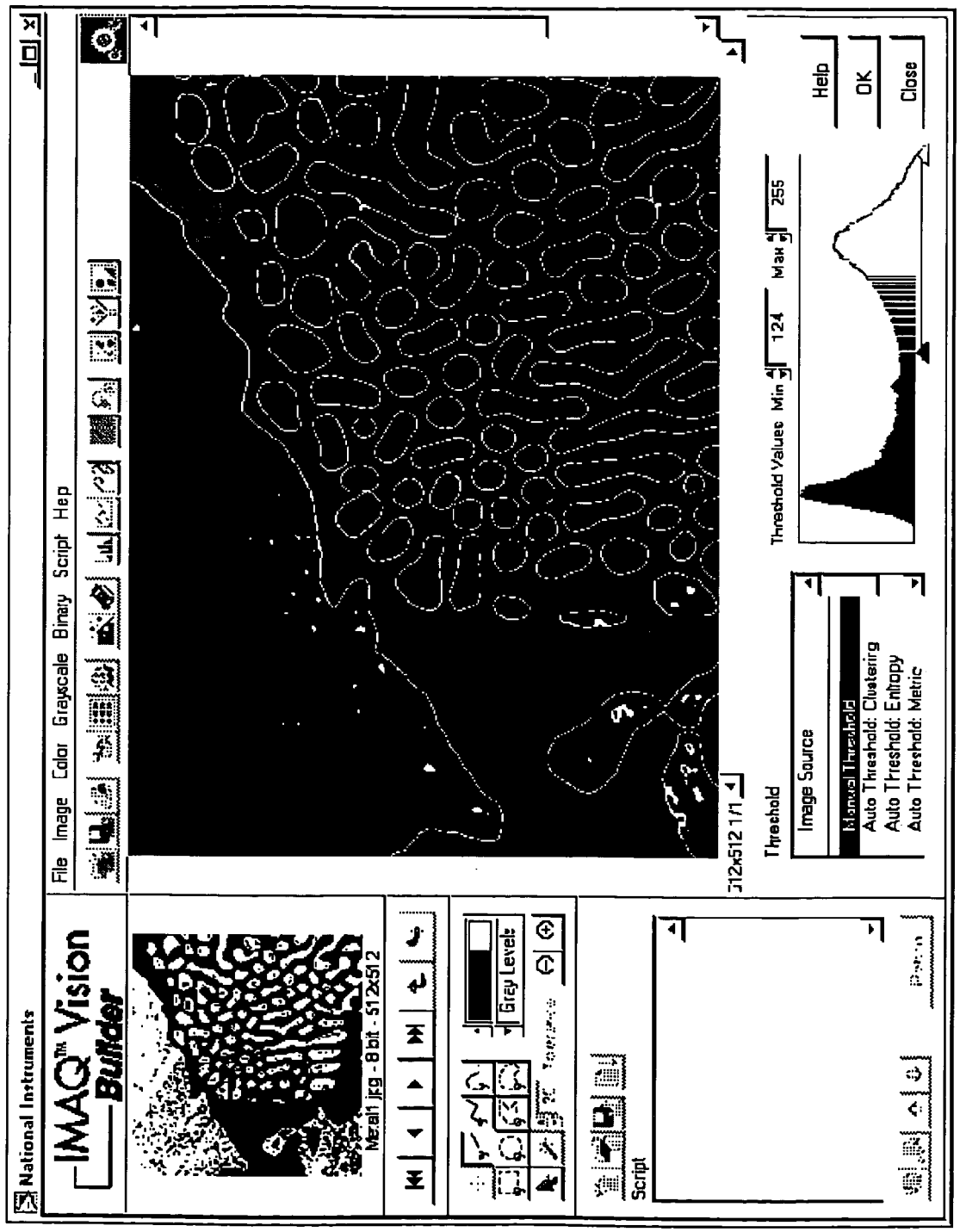
Figure 11:
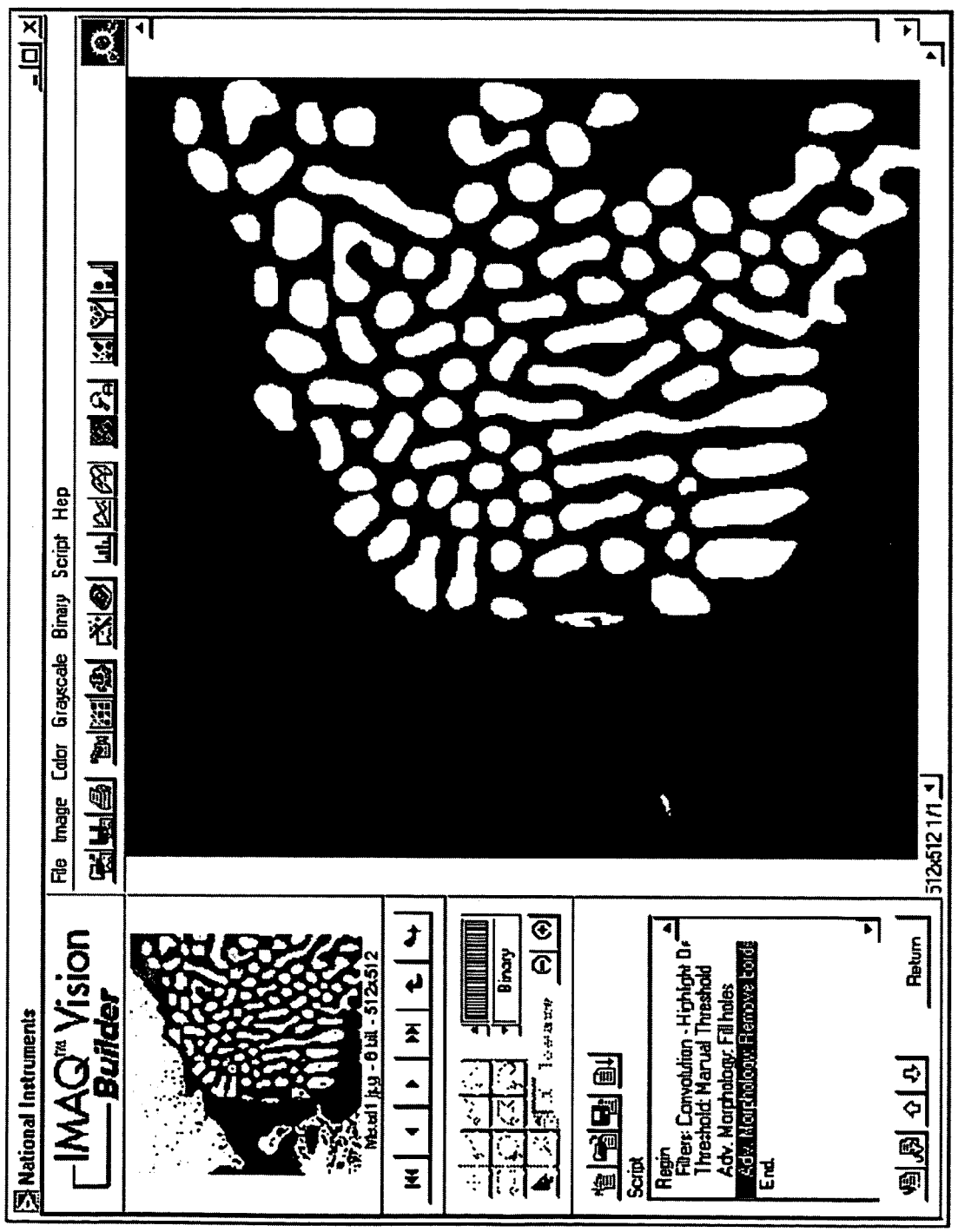
Figure 12:
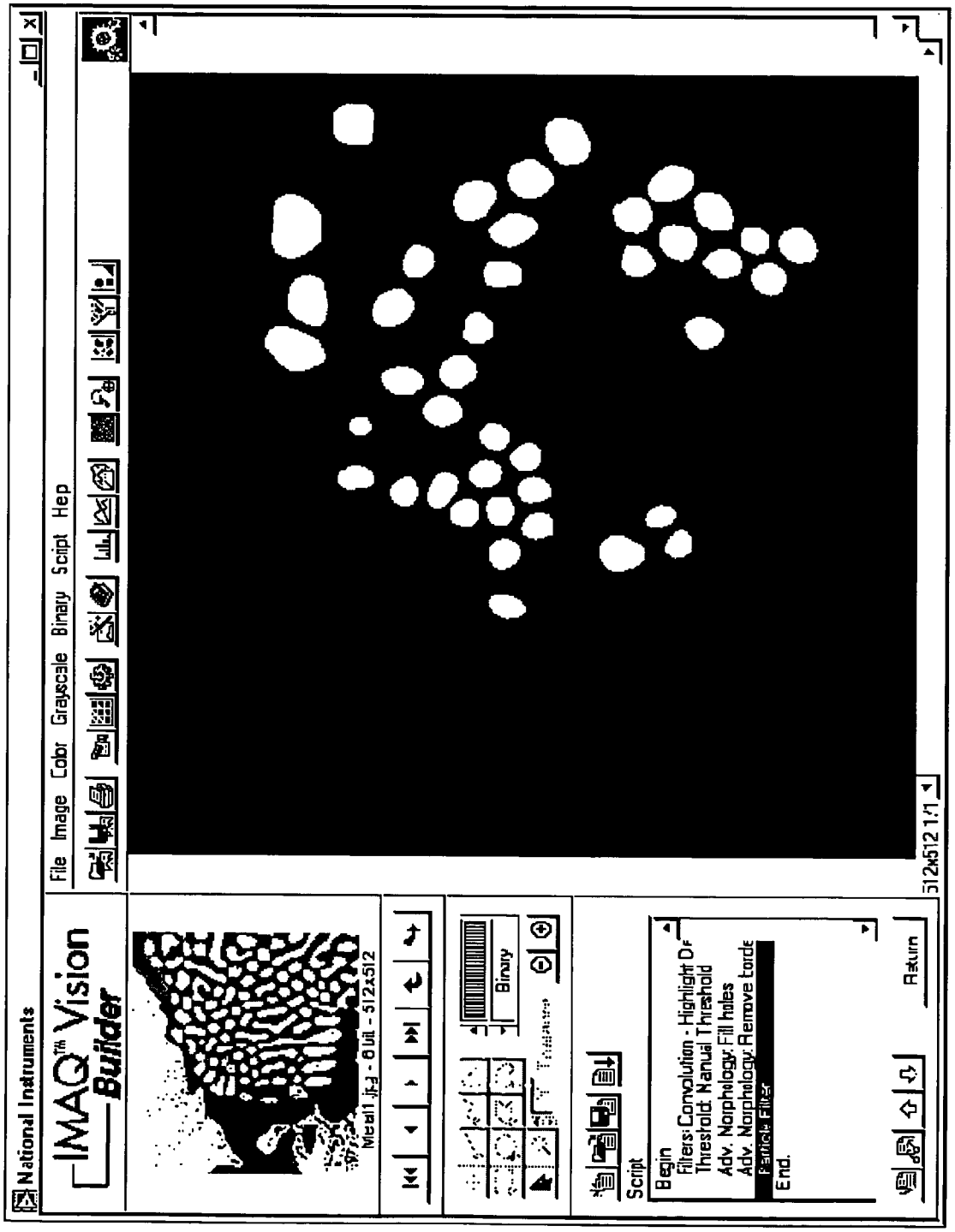

Continuing with the blob analysis example, after the thresholding operation is applied, the FIG. 9 binary image is obtained. The FIG. 9 particles are referred to as blobs. The user may then apply morphological functions to the image, where the morphological functions affect each blob on an individual basis. The FIG. 11 processing window illustrates the results of applying two successive morphological functions to the image: a "Fill Holes" function to fill holes in the particles, and a "Remove Border Objects" function to remove objects that touch the border of the image. These morphological functions are also displayed in the FIG. 11 script window.

The user may next want to apply a particle filter function which isolates and keeps the circular blobs and removes the non-circular blobs from the image. The FIG. 12 processing window illustrates the results of applying such a particle filter. The particle filter operation is displayed in the FIG. 12 script window.

Figure 13:
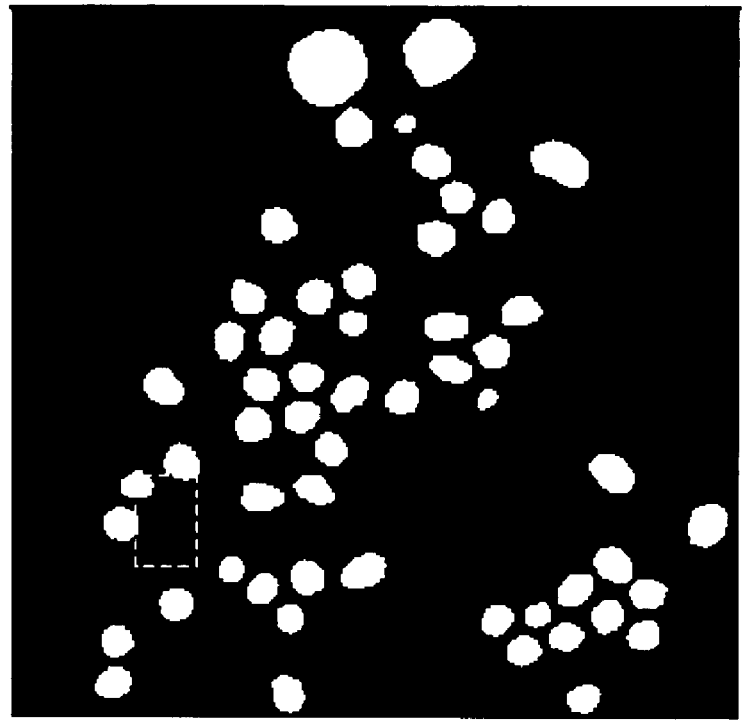
Figure 13:
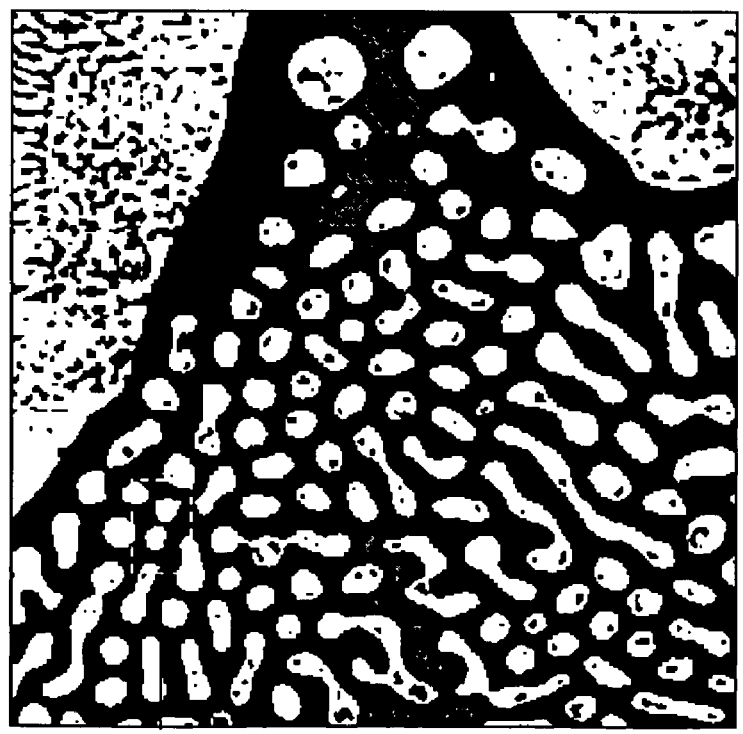

Once the user has developed the desired image processing algorithm in the prototyping environment, the user may test the algorithm on other images. As described above, a script describing each step of the algorithm may be recorded, and the prototyping environment may be operable to "replay" this script on other images. For example, FIG. 13 illustrates an original image (Metal3.jpg) and the image that results from applying the script described above for FIGS. 7-12. Notice that the resulting image is similar to the FIG. 12 result, in which circular blobs are isolated. Of course, the blob analysis algorithm discussed above is exemplary only, and image processing algorithms to perform any of various other types of image manipulations or analyses may be developed.

Figure 14:
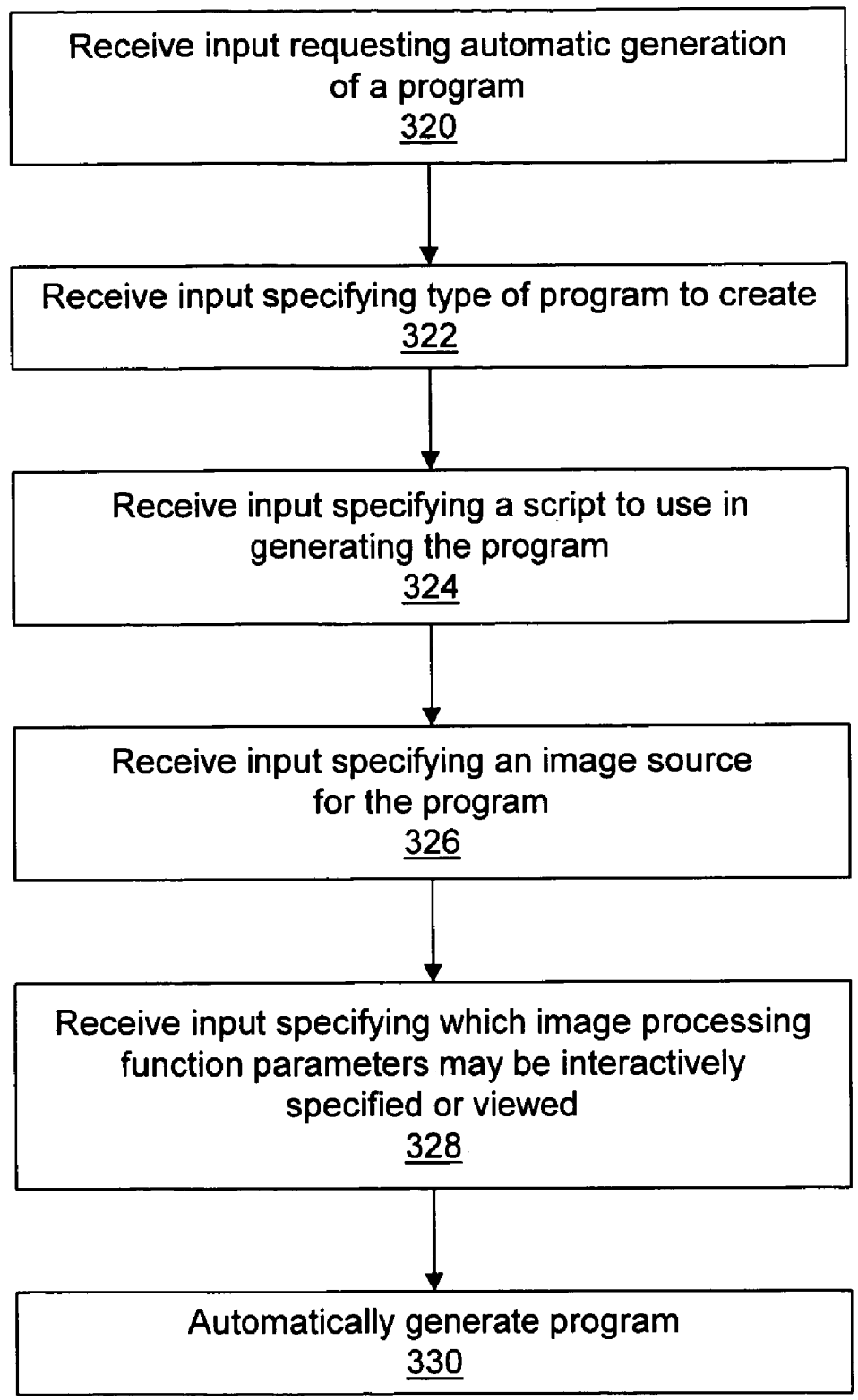
FIG. 14 is a flowchart diagram illustrating one embodiment of a method for receiving information to be used in automatically generating an image processing program.

FIGS. 14-19: Requesting an Image Processing Program to be Generated from a Script Once the user has developed and tested an image processing algorithm in the image prototyping environment, the prototyping environment (or a separate program) may be operable to automatically generate a program to perform the algorithm. FIG. 14 is a flowchart diagram illustrating one embodiment of a method for receiving information to be used in generating the program. In one embodiment, a code generation "wizard", i.e., a series of related user interface dialogs, may be employed to receive the information described in FIG. 14. FIGS. 15-19 illustrate an example of such a code generation wizard.

In step 320 of FIG. 14, input requesting automatic generation of a program is received, e.g., interactively or programmatically. For example, once the user has developed a script as described above, the user may then issue a command to generate a program from the script.

As described above, in various embodiments, any of various types of programs, including text-based and graphical programs, may be generated to implement the image processing algorithm. In step 322, input specifying a type of program to create may be received. The input received in step 322 may specify a particular programming language to use in generating the program and/or may specify a particular programming development environment where the generated program will be used. Many programming development environments support proprietary dialects of programming languages. If a particular programming development environment is specified in step 322, the generated program may utilize proprietary programming or development features, or may adhere to proprietary requirements.

Figure 15:
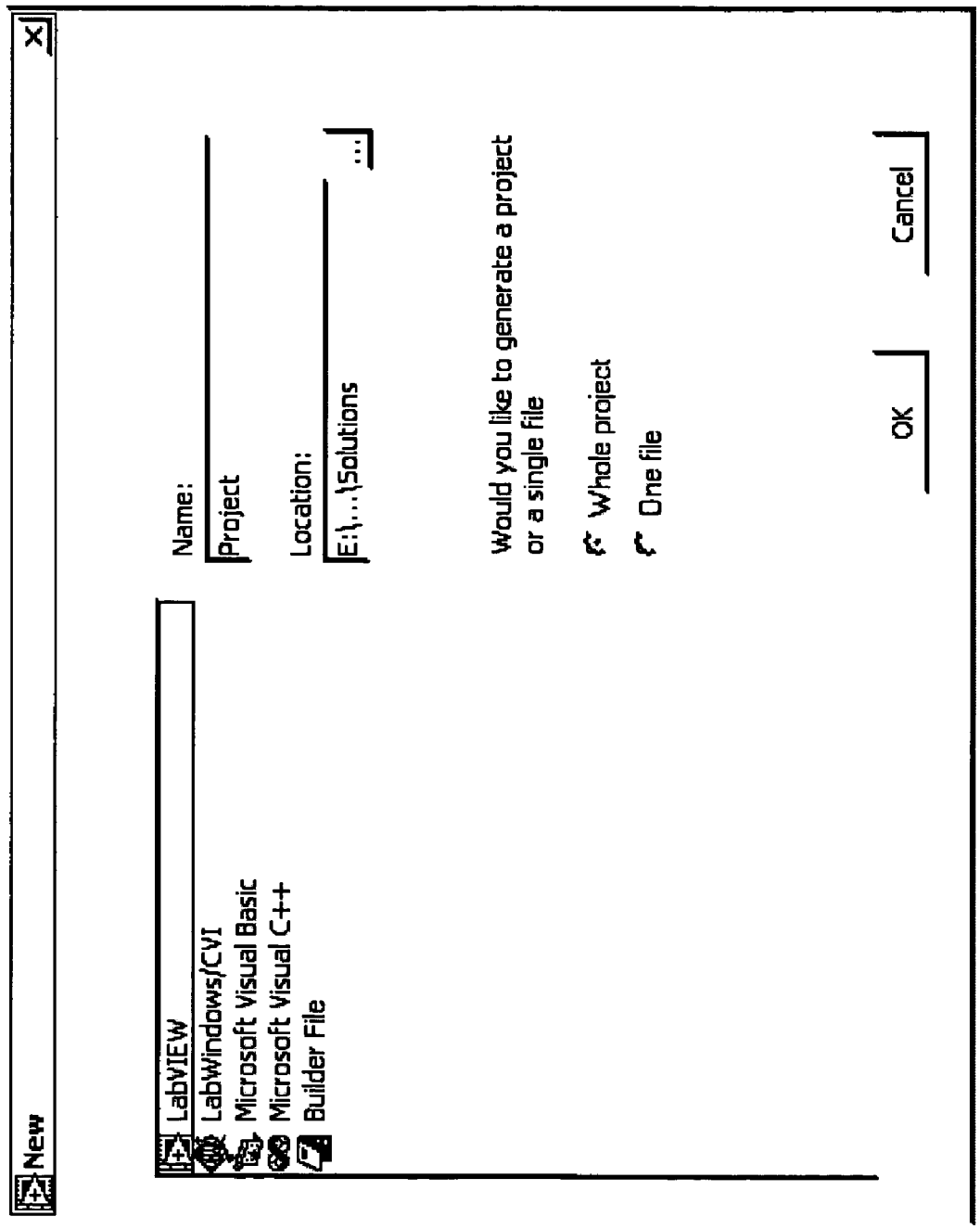
FIG. 15 illustrates a user interface for receiving information specifying a program type to create.

FIG. 15 illustrates a user interface for receiving information specifying a program type to create. A selectable list of various programming development environments is shown. In this example, the list includes a graphical programming development environment, LabVIEW, as well as various text-based programming environments, including LabWindows/CVI, Microsoft Visual Basic, and Microsoft Visual C++. In alternative embodiments, any of various other programming languages or development systems may be supported.

As shown in FIG. 15, a user may also specify whether to generate additional files or other elements associated with the generated program. For example, many programming development environments utilize proprietary file types, such as project files that specify information or settings for an application. For an embodiment supporting such programming development environments, the user may specify whether to generate only the file(s) implementing the program or to also generate a project file or other relevant files associated with the program.

Figure 16:
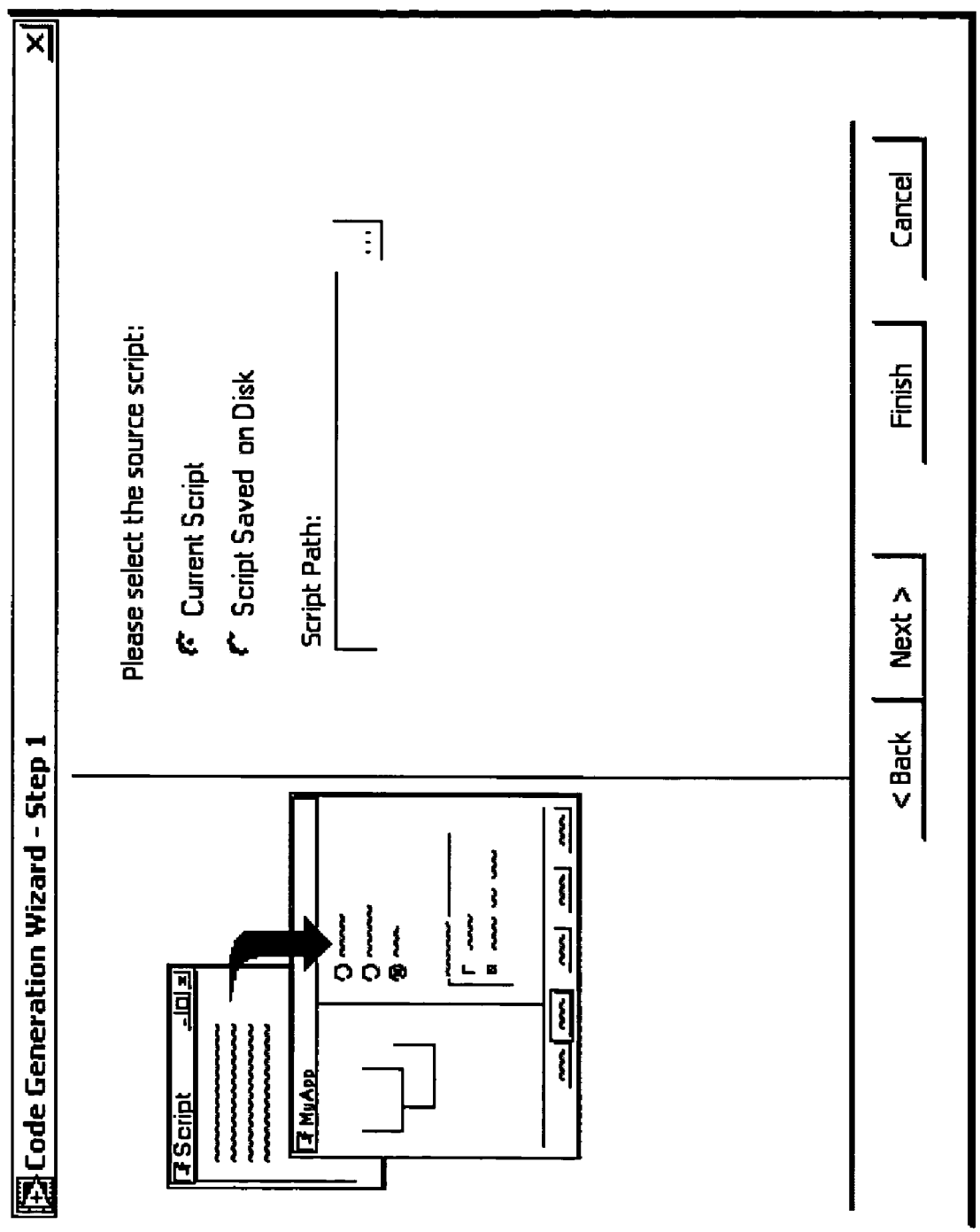
FIG. 16 illustrates a user interface for receiving information specifying a particular script to use in generating a program.

In step 324, input specifying a particular script to use in generating the program may be received. For example, a script developed as described above may be saved to a script file, which is then specified in step 324. Alternatively, a current script, i.e., a script that is currently open or in use, may be specified. FIG. 16 illustrates a user interface for receiving the information of step 324. In one embodiment, the current script is automatically used in generating the program.

Figure 17:
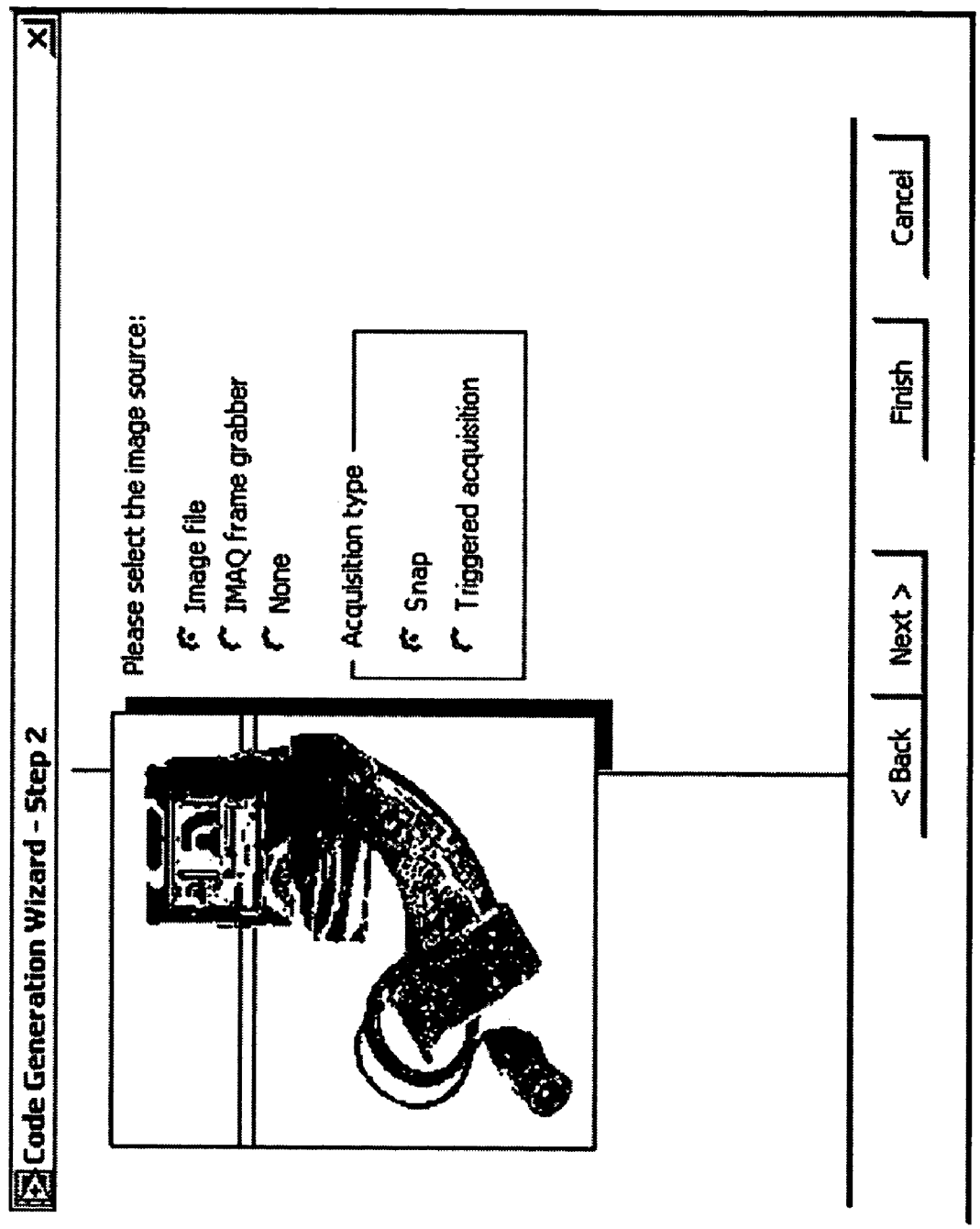
FIG. 17 illustrates a user interface for specifying an image source type for a program.

In step 326, input specifying an image source or type of image source for the program may be received. In one embodiment, the generated program may perform different operations, depending on the type of image source. For example, if the image source is an image file, the program may include code for opening the file, extracting the image from the file, etc. If the image source is a hardware device, the program may include code for initializing the hardware device, acquiring the image from the device, etc. FIG. 17 illustrates an exemplary user interface for specifying an image source type. In this example, either an image file or a framegrabber hardware device may be specified. As shown in FIG. 17, if the image source is a hardware device, various parameters relating to the device, e.g., snap or triggered acquisition may also be specified in step 326.

Figure 18:
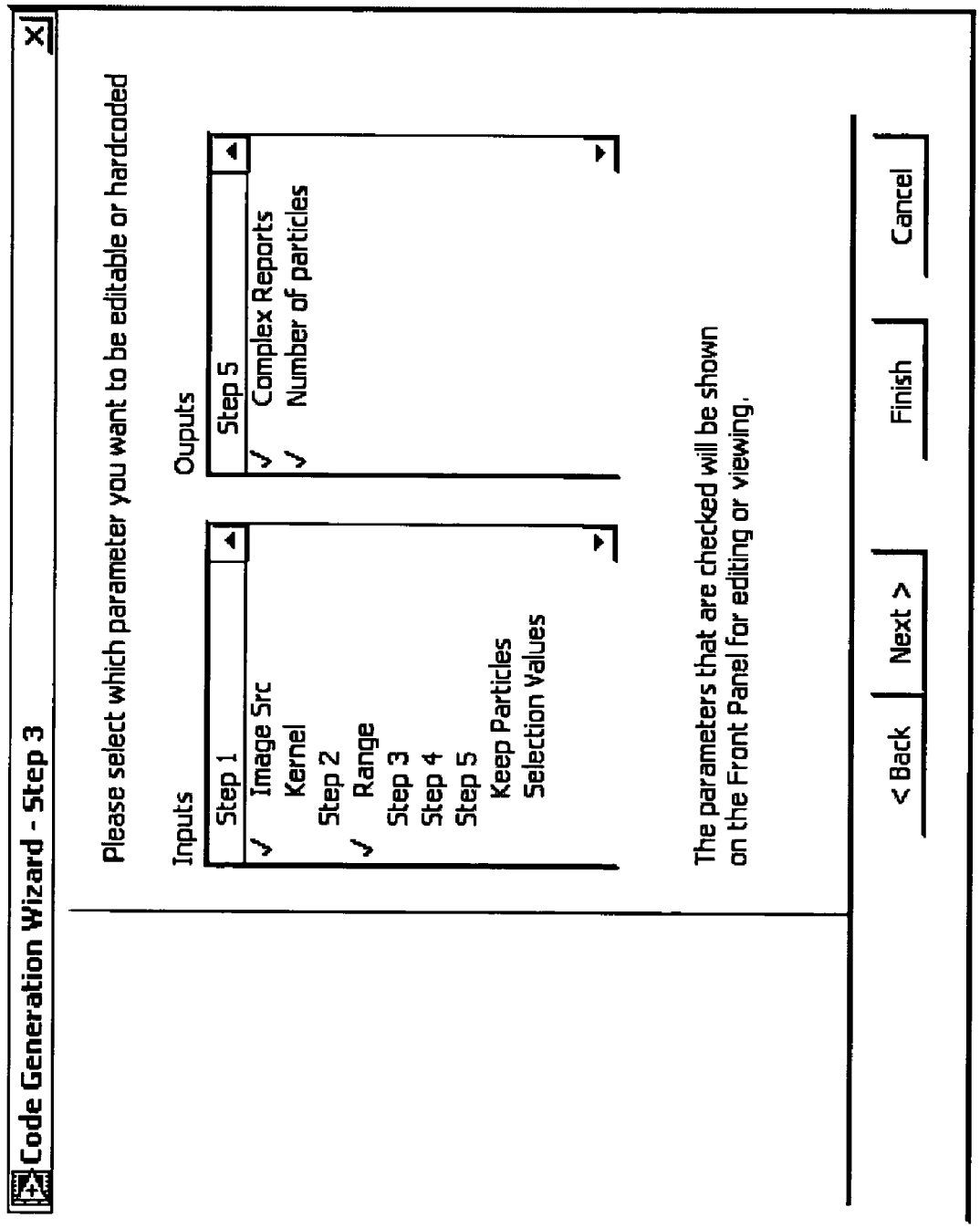
FIG. 18 illustrates a user interface for specifying input and output parameters for a program that are desired to be interactively changeable or viewable.
Figure 22:
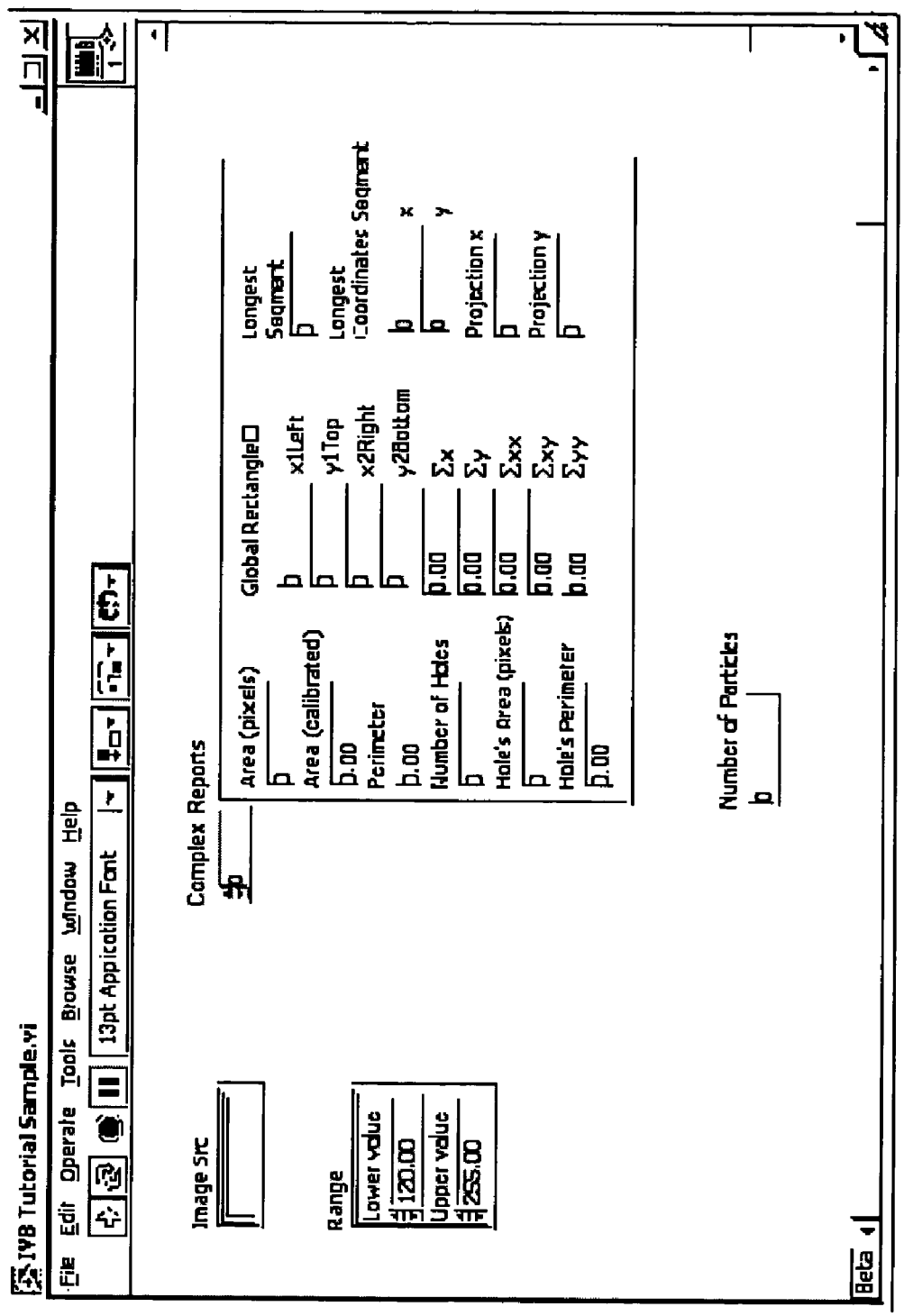
FIG. 22 illustrates a user interface panel including user interface controls and indicators for specifying input parameter values and displaying output parameter values for the graphical program of FIG. 21.

In step 328, input specifying which image processing function parameters may be interactively specified or viewed may be received. As described above, each particular image processing function may have associated input and/or output parameters or settings. FIG. 18 illustrates a user interface for receiving input specifying the input and output parameters that are desired to be interactively changeable or viewable. The items displayed in FIG. 18 correspond to the final script shown in the script window of FIG. 12. As shown, the user interface divides the items into input or output parameters and sub-divides each group to illustrate which step of the script the items correspond to. For example, as discussed above with reference to FIG. 10, step 2 of the script, a threshold operation, may utilize input parameters specifying minimum and maximum threshold values. The user interface shows an item labeled "Range" which corresponds to these input parameters. The user may place a check beside each input parameter desired to be interactively changeable and beside each output parameter desired to be interactively viewable. FIG. 22, discussed below, illustrates a user interface panel with user interface controls and indicators corresponding to the selected input and output parameters, respectively.

In step 330, the program is automatically generated, using the information received in steps 322-328. Step 330 may be performed in any of various ways as appropriate for a particular programming language or program development environment. For example, each step recorded in a script may correspond to a particular function or group of functions, and the prototyping environment may create a program that calls the appropriate functions. In various embodiments, additional elements may also be included in the created program. For example, as described above, the created program may include functions or nodes operable to load or acquire an image, display the image, etc.

Figure 19:
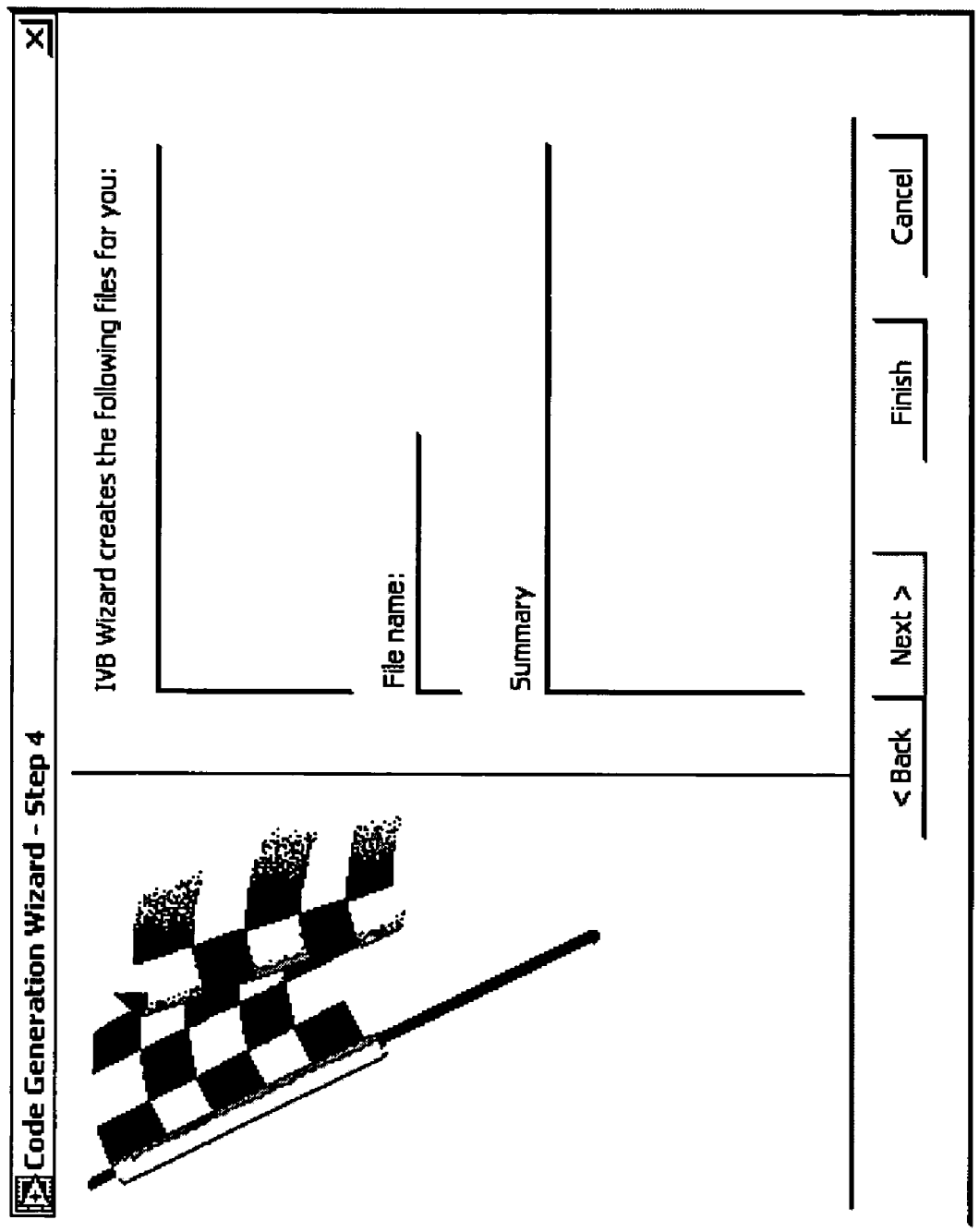
FIG. 19 illustrates a user interface for specifying a file name for a program file.

One or more files including program code may be generated in step 330. FIG. 19 illustrates a user interface for receiving input specifying a file name for a program file. Also, as described above, step 330 may comprise generating other files, e.g., project files, in addition to the file(s) specifying the program code.

As noted above, the flowchart of FIG. 14 represents one embodiment of a method for receiving information to be used in generating a program, and various steps of FIG. 14 may be added, omitted, reordered, combined, etc. For example, the method may receive additional input in addition to that described above, to be used in generating the program. This additional input may pertain, for example, to a particular program development environment that is supported, and/or may serve to enhance the functionality described above. As one example, additional input regarding the image source for a program may be received, e.g., to specify a particular default image file name.

Maintaining an Association Between a Script and a Generated Program

In one embodiment, an association between the script created in the prototyping environment and the program generated from the script may be maintained. This association may enable a user to run the automatically generated program and then return to the prototyping environment in order to view or edit the script used to create the program. The ability to return to the prototyping environment may be useful, for example, if while using the program to process images, it is discovered that the program has an error or needs to be modified for other reasons.

The association between the script and the generated program may be implemented in any of various ways. For example, in one embodiment, a program file may be enabled to store information related to the program; thus, the script information may be stored in the program file when the program is created. In another embodiment, the script information may be stored in another file associated with the program, such as a project or resource file. In another embodiment, the prototyping environment may be operable to store the script information. For example, when the program is created, the prototyping environment may determine or receive a key usable for uniquely identifying the program, and this key may later be used by the prototyping environment to retrieve the script information used to create the program. In another embodiment, information specifying the script used to create the program may not be maintained, but rather, the prototyping environment may be operable to read the program and automatically re-create the script used to create the program.

In various embodiments, a user may perform any of various actions in order to return to the prototyping environment to view or edit the script associated with a program. For example, the program may be a program associated with a development environment that is coupled with the prototyping environment, and the user may be able to automatically return to the prototyping environment by issuing a command to the development environment, e.g., by selecting a menu item. In another embodiment, the user may first view the user interface for the prototyping environment and then select the script corresponding to the program.

In one embodiment, a program created from a script may be "locked". While the program is locked, the user may be prevented from modifying the program. The ability to lock the program may be useful, for example, in order to ensure that the state of the program corresponds to the state of the script used to create the program when the user returns to the prototyping environment. If the user desires to modify the program, the user may unlock the program, e.g., by selecting an option in a development environment associated with the program. The mechanisms of locking and unlocking a program may be implemented in any of various ways, according to methods supported by a particular system or programming environment.

Figure 20:
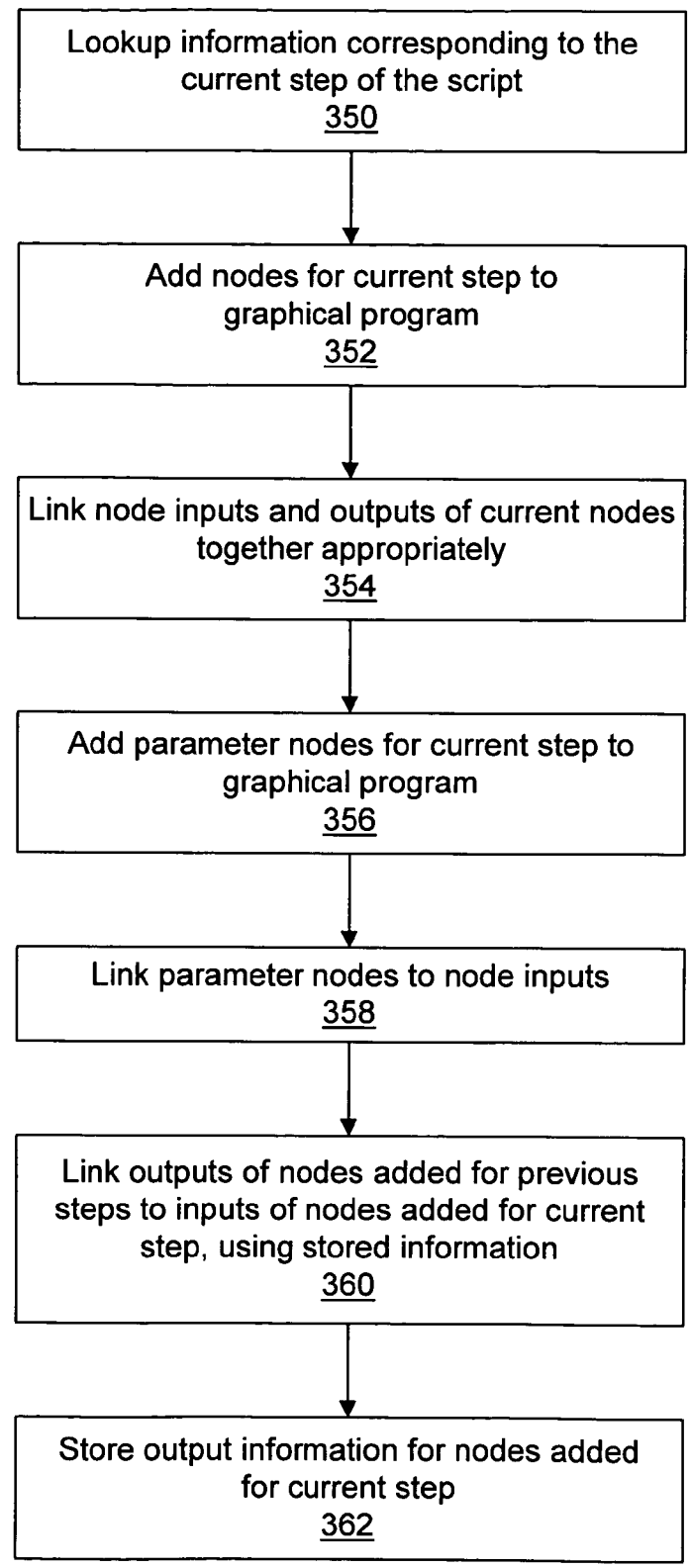
FIG. 20 is a flowchart diagram illustrating one specific embodiment of automatically generating a program from a script, wherein the generated program is a graphical program.

FIG. 20—Automatic Graphical Program Generation

As discussed above, any of various types of programs, including graphical programs, may be automatically generated from a script developed in the prototyping environment. FIG. 20 is a flowchart diagram illustrating one specific embodiment of automatically generating a program from a script, wherein the generated program is a graphical program. As described above, the script may include a number of steps, where each step represents a particular image processing function. FIG. 20 illustrates a method that may be performed for each step in the script, in order to generate graphical program code corresponding to the script step. It is noted that various steps of FIG. 20 may be combined, reordered, altered, omitted, etc.

Step 350 of FIG. 20 is to lookup information corresponding to the current step of the script, e.g., from a database. For example, each possible image processing function step that can appear in a script may have a corresponding key, such as the image processing function name, that may be used to lookup the information.

As described above, a graphical program diagram may comprise nodes which are connected together to model the program data flow or control flow, where various nodes represent different functional blocks. For each image processing function step of a script, the step may be implemented in a graphical program using one or more nodes that are connected to each other appropriately. For example, FIG. 8 illustrates a convolution filter function step in the prototyping environment script window. This convolution filter function may correspond to a single node available in a graphical programming system, wherein the node implements the convolution functionality. Alternatively, the convolution filter function may be implemented using a plurality of graphical program nodes. The graphical program nodes may be any of various types of nodes supported by a particular graphical programming system, including subprogram nodes, function nodes, etc. In the preferred embodiment, the graphical programming system provides a library of nodes related to image processing functions, which may be used in implementing steps of the script.

Thus, the information retrieved in step 350 may include a list of one or more nodes to add to the graphical program, in order to implement the current step of the script. The information may also include information specifying how the inputs and outputs of these nodes should be linked to each other, in order to accomplish the desired data or control flow. The link information may be specified in any of various ways, as appropriate for a particular graphical programming system. For example, in one embodiment, each graphical program node includes terminals corresponding to each node input or output. Thus, the link information may specify pairs of node terminals that should be connected to each other.

The information retrieved in step 350 also may include parameter information. As described above, various parameters or settings may be associated with each step in a script. These parameters may be represented in the graphical program as leaf nodes which provide input to or display output from the nodes which implement the current step of the script. Thus, the parameter information may include a list of leaf nodes to add to the graphical program, in order to provide or accept the parameter values to or from the other nodes. A type may be specified for each parameter. For example, if an input parameter is an integer value, a corresponding leaf node may be created as an integer constant node, i.e., a node which is operable to output an integer constant. A default value for the parameter may also be specified. For input parameters, information specifying which node input the output of the corresponding leaf node should connect to may also be specified. For output parameters, information specifying which node output the input of the corresponding leaf node should connect to may also be specified.

As discussed above, the user may designate certain parameter values that he wishes to be able to change or display interactively. For these parameters, a leaf node constant representing the parameter value is preferably not connected to the node input/output that receives/generates the parameter value. Instead, a user interface control or indicator representing the parameter value may be created, and the node input or output that receives or generates the parameter value may be configured to receive or set the value of this user interface control or indicator. In one embodiment, when a user interface control or indicator is created, a corresponding node may be automatically created in the graphical program diagram. Thus, the output or input of the node corresponding to the user interface control/indicator may simply be connected to the node input or output that receives or generates the parameter value. For other embodiments, the node input/ouput may be connected to the user interface control/indicator value in any of various other ways, as supported by the particular embodiment.

The parameter information obtained in step 350 may include information specifying the type of user interface control/indicator to create and possibly other user interface information. For example, for a parameter that may be one of several strings, the parameter information may specify that a user interface control for selecting from a list of strings should be created and may specify the list of strings to configure the control with. Alternatively, the system may be operable to automatically create an appropriate user interface control or indicator by examining the type information of the node input or output that control or indicator connects to. This automatic creation of user interface controls/indicators is discussed below.

In step 352, the nodes determined in step 350 are added to the graphical program. Elements may be added to the graphical program in any of various ways. For example, the application that generates the graphical program may comprise program logic for creating a graphical program file that is formatted appropriately. However, in the preferred embodiment, the application interfaces with a graphical programming system and requests the graphical programming system to create the desired program.

In step 354 the inputs and outputs of the nodes added in step 352 are linked to each other appropriately, using the information from step 350. Again, the application may perform step 354 directly or may request a graphical programming system to connect the node inputs and outputs.

In step 356, nodes representing parameters to the image processing functions for the current step of the script are added to the graphical program, using the information from step 350. For example, various leaf nodes may be added, as described above. In step 358, the outputs of the parameter nodes are connected to the appropriate inputs of the nodes added in step 352. Step 356 may also involve configuring the leaf nodes with an appropriate value. As noted above, when a step is added to a script, parameter values specified by the user (or default values) may be associated with the step. These parameter values may be used to configure the leaf nodes with an appropriate value. For example, in FIG. 10, a maximum threshold parameter value of 255 is illustrated. In this example, a leaf node representing the maximum threshold parameter may be created as an integer constant and may configured with a value of 255. Thus, this leaf node would provide the value 255 to the node input that the leaf node is connected to. For a parameter that is interactively changeable, steps 356 and 358 may involve creating a user interface control for the parameter and linking the control to the appropriate node input, as described above.

Steps 350-358 describe adding graphical program elements pertaining to a particular step of the script to the graphical program. For a given current step, it may be necessary to link various outputs of nodes added for previous steps to inputs of nodes added for the current step. For each step, information regarding outputs of nodes added for the step are stored, e.g., in a table in memory. In step 360, this stored information is used to connect the appropriate outputs of nodes previously added to inputs of nodes added for the current step. For example, in addition to specifying the desired links between nodes added for the current step of the script, the information obtained in step 350 may also specify when an input of a node added for the current step should be connected to an output of a node added for a previous step in the script. The stored information may then be searched to determine which previous node output should connect to the current node input. Any of various types of information enabling this determination may be stored, as appropriate for a particular embodiment, such as output terminal names, output data types, etc.

In step 362, output information relating to nodes added for the current step of the script is stored, so that this information will be available for subsequent steps.

Figure 21:
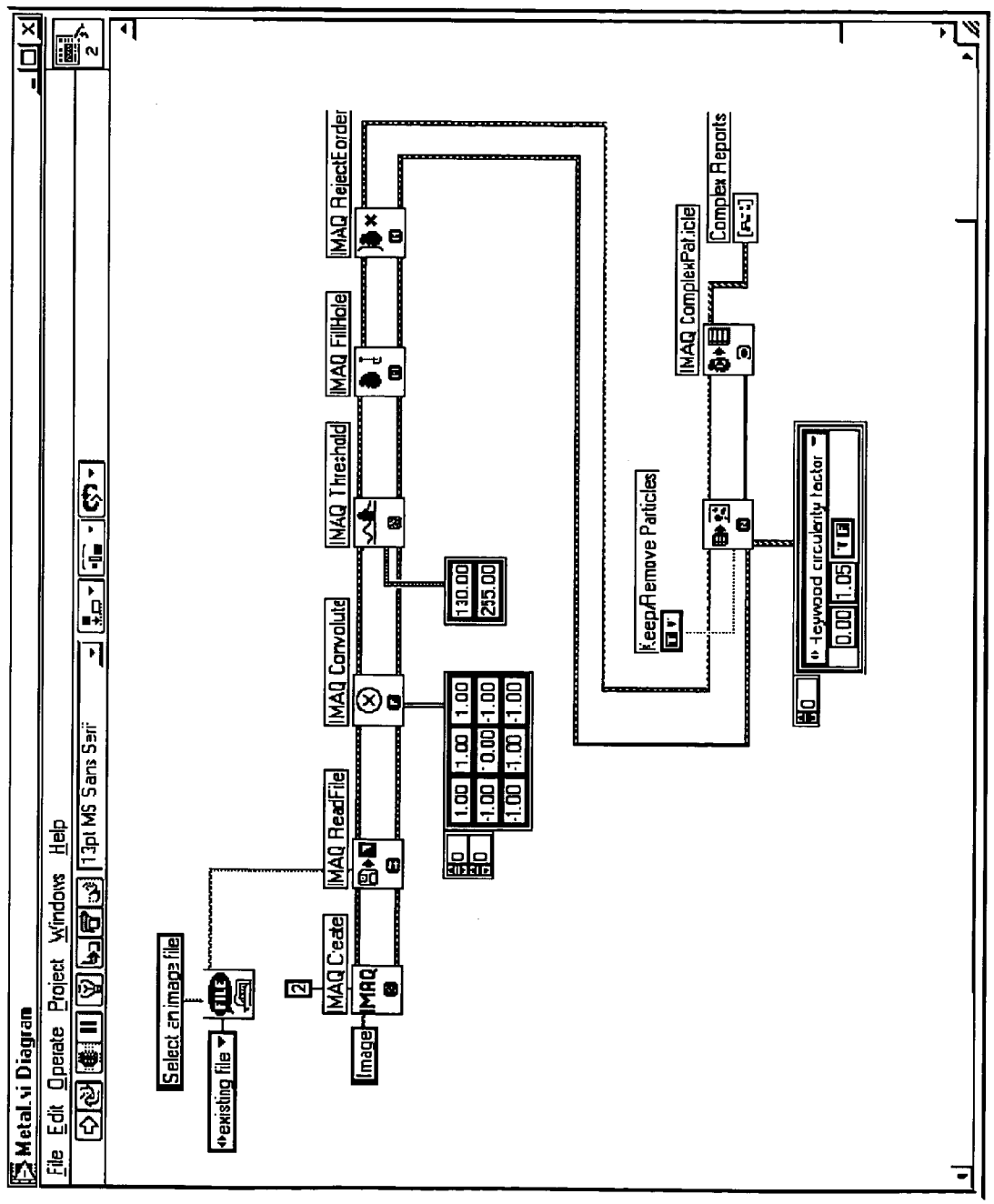
FIG. 21 illustrates an exemplary graphical program that is automatically generated from the image processing algorithm script example discussed with reference to FIGS. 7-13.

FIGS. 21-22: Example of a Generated Graphical Program

FIG. 21 illustrates an exemplary graphical program that is automatically generated from the image processing algorithm script example discussed with reference to FIGS. 7-13. For convenience, the graphical program diagram is grouped into portions, and each portion is labeled in order to illustrate which step of the script the portion implements. As described above, each portion includes one or more nodes which implement the image processing function specified by the corresponding step of the script. For nodes that accept or provide parameter values, the nodes are connected to leaf nodes that provide or accept the parameter values to or from the nodes.

The graphical program of FIG. 21 correspond to the code generation user interface screen shown in FIG. 18, in that the program is operable to accept interactive user input specifying the input parameters selected in FIG. 18 and is operable to display the output parameters selected in FIG. 18. FIG. 22 illustrates a user interface panel including user interface controls and indicators corresponding to the selected input and output parameters. This user interface panel may be generated along with the graphical program block diagram. Each user interface control or indicator on the user interface panel has a corresponding leaf node in the block diagram. For example, the block diagram leaf node labeled "Range" corresponds to the user interface control labeled "Range", and the output of the "Range" leaf node is connected to the input of the "IMAQ Threshold" node, so that the "IMAQ Threshold" node receives the new range values as they are adjusted by a user.

Note that for the parameters which are not selected in FIG. 18, no corresponding user interface controls or indicators are created, and values for these parameters are instead hardcoded into the block diagram. For example, the "Keep Particles" item is unselected in FIG. 18, and a Boolean constant leaf node labeled "Keep/Remove Particles" is connected to one of the nodes which implement step 5 of the script. The constant value may be set to True or False, e.g., depending on the settings the user specified when the script was created.

As noted above, in one embodiment, an appropriate user interface control or indicator for a selected parameter may be automatically created by examining the type information of the node input or output that the control or indicator connects to. For example, as discussed below, the prototyping environment may interface with a graphical programming system and may request the graphical programming system to create each graphical program object. The graphical programming system may be operable to automatically create a user interface control or indicator that matches the data expected by a node input or produced by a node output. For example, with respect to the block diagram node labeled "IMAQ Threshold", the graphical programming system may examine the input terminal of the node and discover that the terminal expects two integer values. The graphical programming system may then create a user interface control appropriate for providing two integer values, such as the "Range" control illustrated in FIG. 22.

Interfacing with a Graphical Programming System

As described above, in one embodiment the prototyping environment may interface with a graphical programming system in order to automatically generate a graphical program implementing a script. The graphical programming system may support an application programming interface (API) that allows callers to create or edit graphical programs and add objects or nodes to graphical programs in order to achieve the desired functionality. For example, the prototyping environment may first call an API function to create a graphical program object, obtaining a reference to this object. The prototyping environment may then call an API function to add nodes representing the appropriate image analysis functions to the graphical program object.

The graphical programming system may support any of various types of APIs for callers to use. For example, many applications are operable to call standard ActiveX/COM components. Thus, in one embodiment, the graphical programming system may expose COM objects that the prototyping environment may call to create the graphical program. In another embodiment, the graphical programming system may provide a graphical API for creating graphical programs. An exemplary graphical API that may be used for creating a graphical program is described in U.S. patent application Ser. No. 09/518,492, which is incorporated by reference above.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for generating a computer program, the method comprising:
   receiving user input to a prototyping application, wherein the user input specifies a prototype, wherein the prototype comprises a series of functional operations, wherein the functional operations include a first functional operation with one or more associated parameters;
   automatically generating a program that implements the prototype, in response to the specified prototype, wherein the program is operable to execute independently of the prototyping application;
   wherein said automatically generating the program comprises automatically generating a graphical user interface for the program;
   wherein said automatically generating the graphical user interface comprises automatically creating one or more graphical user interface elements associated with the one or more parameters of the first functional operation, wherein during execution of the program, at least one of the one or more graphical user interface elements is displayed and is operable to receive user input independently of the prototyping application.

2. The method of claim 1,
   wherein said automatically generating the program comprises automatically generating source code for the program without direct user input specifying the source code.

3. The method of claim 1,
   wherein the first functional operation has an associated input parameter;
   wherein the one or more automatically created graphical user interface elements include a graphical user interface element for interactively receiving user input specifying a value for the input parameter.

4. The method of claim 1,
   wherein the first functional operation has an associated output parameter;
   wherein the one or more automatically created graphical user interface elements include a graphical user interface element for viewing program output indicating a value for the output parameter.

5. The method of claim 1, wherein the one or more parameters associated with the first functional operation comprises a plurality of parameters, the method further comprising:
   receiving user input to the prototyping application specifying which of the plurality of parameters are desired to have associated graphical user interface elements;
   wherein said automatically generating the graphical user interface comprises automatically creating a graphical user interface element associated with each specified parameter of the first functional operation, but not creating graphical user interface elements associated with unspecified parameters of the first functional operation.

6. The method of claim 1,
   wherein the automatically generated program comprises a text-based program;
   wherein automatically generating the program comprises automatically generating source code for the program in a text-based programming language.

7. The method of claim 1,
   wherein the automatically generated program comprises a graphical program;
   wherein automatically generating the program comprises automatically generating graphical source code for the graphical program, wherein the graphical source code includes a plurality of interconnected nodes that visually indicate functionality of the graphical program.

8. The method of claim 1,
   wherein the prototyping application interfaces with a programming environment application in order to perform said generating the program.

9. The method of claim 1, wherein the first functional operation has a first parameter that has an associated data type, the method further comprising:
   determining the data type of the first parameter;
   wherein automatically creating the one or more graphical user interface elements comprises automatically creating a first graphical user interface element associated with the first parameter, wherein the first graphical user interface element is operable to receive user input according to the data type of the first parameter.

10. The method of claim 1,
    wherein the prototype specifies an image processing algorithm;
    wherein the automatically generated program implements the image processing algorithm.

11. The method of claim 10,
wherein the one or more automatically created graphical user interface elements include a first graphical user interface element for receiving user input specifying a value for an input parameter of the first functional operation, wherein the value for the input parameter affects the image processing algorithm.

12. The method of claim 10,
wherein the one or more automatically created graphical user interface elements include a first graphical user interface element for viewing an output value for an output parameter of the first functional operation, wherein the output value is determined by the image processing algorithm.

13. The method of claim 1, wherein said automatically generating the program comprises:
automatically generating a block diagram, wherein the block diagram comprises a plurality of interconnected nodes that visually indicate functionality of the program.

14. The method of claim 1, wherein said generating the graphical user interface comprises:
automatically generating a user interface panel, wherein the user interface panel comprises the one or more graphical user interface elements.

15. The method of claim 1,
wherein said automatically generating the program comprises automatically generating source code to perform the functional operations of the prototype;
wherein the source code is automatically generated in a format that allows a user to edit the automatically generated source code.

16. The method of claim 1,
wherein the functional operations also include a second functional operation with one or more associated parameters;
wherein said automatically generating the graphical user interface further comprises automatically creating one or more graphical user interface elements associated with the one or more parameters of the second functional operation.

17. The method of claim 1, further comprising:
executing the automatically generated program, wherein said executing the automatically generated program comprises displaying the automatically generated graphical user interface independently of the prototyping application.

18. The method of claim 1,
wherein the automatically generated program is operable to perform the functional operations of the prototype.

19. A system for generating a computer program, the system comprising:
a processor;
a memory coupled to the processor, wherein the memory stores program instructions executable by the processor to implement;
a prototyping environment application for receiving user input specifying a prototype, wherein the prototype comprises a series of functional operations, wherein at least one of the operations has an associated one or more parameters;
wherein the prototyping environment application is operable to automatically generate a program that implements the prototype, in response to the specified prototype, wherein the program is operable to execute independently of the prototyping environment application;
wherein said automatically generating the program comprises automatically generating a graphical user interface for the program;
wherein said automatically generating the graphical user interface comprises automatically creating one or more graphical user interface elements associated with the one or more parameters, wherein during execution of the program, at least one of the one or more graphical user interface elements is displayed and is operable to receive user input independently of the prototyping environment application.

20. The system of claim 19,
wherein said automatically generating the program comprises automatically generating source code for the program without direct user input specifying the source code.

21. The system of claim 19,
wherein at least one of the operations has an associated input parameter;
wherein the one or more automatically created graphical user interface elements include a graphical user interface element for interactively receiving user input specifying a value for the input parameter.

22. The system of claim 19,
wherein at least one of the operations has an associated output parameter;
wherein the one or more automatically created graphical user interface elements include a graphical user interface element for viewing program output indicating a value for the output parameter.

23. The system of claim 19,
wherein a plurality of parameters are associated with the functional operations;
wherein the prototyping environment application is operable to receive user input specifying which of the plurality of parameters are desired to have associated graphical user interface elements;
wherein said generating the graphical user interface comprises creating a graphical user interface element associated with each specified parameter, but not creating graphical user interface elements associated with unspecified parameters.

24. The system of claim 19,
wherein the automatically generated program comprises a text-based program;
wherein automatically generating the program comprises automatically generating source code for the program in a text-based programming language.

25. The system of claim 19,
wherein the automatically generated program comprises a graphical program;
wherein automatically generating the program comprises automatically generating graphical source code for the graphical program, wherein the graphical source code includes a plurality of interconnected nodes that visually indicate functionality of the graphical program.

26. The system of claim 19,
wherein the prototyping environment application interfaces with a programming environment application in order to perform said generating the program.

27. The system of claim 19,
wherein at least one parameter has an associated data type;
wherein the prototyping environment application is operable to determine the data type of the at least one parameter;
wherein creating a graphical user interface element associated with the at least one parameter comprises creating a graphical user interface element according to the data type of the at least one parameter.

28. The system of claim 19,
wherein the prototyping environment application is an image processing prototype environment application;

wherein the prototype specifies an image processing algorithm;
wherein the automatically generated program implements the image processing algorithm.

29. The system of claim 28,
wherein the one or more automatically created graphical user interface elements include one or more graphical user interface elements for receiving input parameter values affecting the image processing algorithm.

30. The system of claim 28,
wherein the one or more automatically created graphical user interface elements include one or more graphical user interface elements for viewing output parameter values determined by the image processing algorithm.

31. A memory medium comprising program instructions executable to:
receive user input to a prototyping application, wherein the user input specifies a prototype, wherein the prototype comprises a series of functional operations, wherein at least one of the operations has an associated one or more parameters;
automatically generate a program that implements the prototype, in response to the specified prototype, wherein the program is operable to execute independently of the prototyping application;
wherein said automatically generating the program comprises automatically generating a graphical user interface for the program;
wherein said automatically generating the graphical user interface comprises automatically creating one or more graphical user interface elements associated with the one or more parameters, wherein during execution of the program, at least one of the one or more graphical user interface elements is displayed and is operable to receive user input independently of the prototyping application.

32. The memory medium of claim 31,
wherein said automatically generating the program comprises automatically generating source code for the program without direct user input specifying the source code.

33. The memory medium of claim 31,
wherein at least one of the operations has an associated input parameter;
wherein the one or more automatically created graphical user interface elements include a graphical user interface element for interactively receiving user input specifying a value for the input parameter.

34. The memory medium of claim 31,
wherein at least one of the operations has an associated output parameter;
wherein the one or more automatically created graphical user interface elements include a graphical user interface element for viewing program output indicating a value for the output parameter.

35. The memory medium of claim 31, wherein a plurality of parameters are associated with the functional operations, wherein the program instructions are further executable to:
receive user input to the prototyping application specifying which of the plurality of parameters are desired to have associated graphical user interface elements;
wherein said generating the graphical user interface comprises creating a graphical user interface element associated with each specified parameter, but not creating graphical user interface elements associated with unspecified parameters.

36. The memory medium of claim 31,
wherein the automatically generated program comprises a text-based program;
wherein automatically generating the program comprises automatically generating source code for the program in a text-based programming language.

37. The memory medium of claim 31,
wherein the automatically generated program comprises a graphical program;
wherein automatically generating the program comprises automatically generating graphical source code for the graphical program, wherein the graphical source code includes a plurality of interconnected nodes that visually indicate functionality of the graphical program.

38. The memory medium of claim 31,
wherein the prototyping application interfaces with a programming environment application in order to perform said automatically generating the program.

39. The memory medium of claim 31, wherein at least one parameter has an associated data type, wherein the program instructions are further executable to determine the data type of the at least one parameter;
wherein creating a graphical user interface element associated with the at least one parameter comprises creating a graphical user interface element according to the data type of the at least one parameter.

40. The memory medium of claim 31,
wherein the prototype specifies an image processing algorithm;
wherein the automatically generated program implements the image processing algorithm.

41. The memory medium of claim 40,
wherein the one or more automatically created graphical user interface elements include one or more graphical user interface elements for receiving input parameter values affecting the image processing algorithm.

42. The memory medium of claim 40,
wherein the one or more automatically created graphical user interface elements include one or more graphical user interface elements for viewing output parameter values determined by the image processing algorithm.

43. A computer-implemented method for automatically generating a computer program, the method comprising:
receiving program information to a first application, wherein the program information specifies functionality of the computer program;
automatically generating the computer program in response to the program information, wherein the computer program implements the specified functionality, wherein the program is operable to execute independently of the first application;
wherein said automatically generating the program comprises automatically generating a graphical user interface for the program;
wherein said automatically generating the graphical user interface comprises automatically creating one or more graphical user interface elements for providing input to and/or viewing output from the program, wherein during execution of the program, the one or more graphical user interface elements are displayed and at least one of the one or more graphical user interface elements is operable to receive user input independently of the first application.

44. The method of claim 43,
wherein said automatically generating the computer program comprises automatically generating source code for the program without direct user input specifying the source code.

45. The method of claim 43,
wherein each of the one or more automatically created graphical user interface elements corresponds to one or more parameters specified by the program information.

46. The method of claim 43,
wherein the generated computer program comprises a graphical program,
wherein automatically generating the computer program comprises automatically generating a plurality of interconnected nodes that visually indicate functionality of the graphical program.

47. The method of claim 43,
wherein the received program information specifies one of:
a prototype;
a test executive sequence; and
a state diagram.

48. A method for generating a computer program, the method comprising:
receiving user input specifying a prototype, wherein the prototype comprises a series of functional operations, wherein at least one of the operations has an associated one or more parameters;
in response to said receiving user input specifying the prototype, automatically generating a graphical program, wherein automatically generating the graphical program comprises automatically generating a plurality of interconnected nodes that visually indicate functionality of the graphical program, wherein the plurality of interconnected nodes are operable to perform the series of functional operations;
wherein said automatically generating the graphical program comprises automatically generating a graphical user interface for the graphical program, wherein the graphical user interface for the graphical program comprises at least one graphical user interface element which is associated with at least one of the one or more parameters;
wherein the graphical program is interpretable or compilable;
wherein said receiving user input specifying the prototype is performed by a development environment;
wherein the graphical program comprises second program instructions;
wherein execution of the second program instructions is independent of execution of the development environment.

49. A method for generating a computer program, the method comprising:
receiving user input specifying a prototype, wherein the prototype comprises a series of functional operations, wherein at least one of the operations has an associated one or more parameters;
in response to said receiving user input specifying the prototype, automatically generating a graphical program, wherein automatically generating the graphical program comprises automatically generating a plurality of interconnected nodes that visually indicate functionality of the graphical program, wherein said automatically generating the graphical program further comprises automatically generating a graphical user interface for the graphical program; and
associating at least one of the one or more parameters with an element of the graphical user interface;
wherein said receiving user input specifying the prototype is performed by first program instructions;
wherein the graphical program comprises second program instructions;
wherein execution of the second program instructions is independent of execution of the first program instructions.

50. The method of claim 49, further comprising:
receiving user input indicating the at least one of the one or more parameters;
wherein said associating the at least one of the one or more parameters with the element of the graphical user interface is based on said receiving user input indicating the at least one of the one or more parameters.

51. A method for generating a computer program, the method comprising:
displaying a prototyping environment user interface on a display of a computer system, wherein the prototyping environment user interface is usable to create a prototype;
receiving user input specifying the prototype, wherein the prototype comprises a series of functional operations, wherein at least one of the operations has an associated one or more parameters; and
automatically generating a program that implements the prototype, in response to the specified prototype;
wherein said automatically generating the program comprises automatically generating a graphical user interface for the program;
wherein the graphical user interface of the program comprises at least one graphical user interface element which is associated with at least one of the associated one or more parameters, wherein the at least one graphical user interface element performs at least one of receiving information to the program and outputting information from the program during execution of the program, wherein the graphical user interface of the program is independent of the prototyping environment user interface.

52. The method of claim 51, wherein the program is interpretable or compilable.

53. A method for generating a computer program, the method comprising:
receiving user input to a development environment, wherein the user input specifies a series of functional operations, wherein at least one of the operations has an associated one or more parameters; and
automatically generating a program that implements the series of functional operations, in response to the user input, wherein program execution of the program is independent of execution of the development environment;
wherein said automatically generating the program comprises automatically generating a graphical user interface for the program;
wherein the graphical user interface of the program comprises at least one graphical user interface element which is associated with at least one of the associated one or more parameters, wherein the at least one graphical user interface element performs one or more of receiving information through the graphical user interface and outputting information from through the graphical user interface during execution of the program;
wherein the program is interpretable or compilable.

\* \* \* \* \*